US009436642B2

(12) United States Patent
Yamaguchi et al.

(10) Patent No.: US 9,436,642 B2
(45) Date of Patent: Sep. 6, 2016

(54) BUS SYSTEM FOR SEMICONDUCTOR CIRCUIT

(71) Applicant: Panasonic Corporation, Osaka (JP)

(72) Inventors: Takao Yamaguchi, Osaka (JP); Atsushi Yoshida, Osaka (JP); Tomoki Ishii, Kyoto (JP); Satoru Tokutsu, Saitama (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 234 days.

(21) Appl. No.: 14/467,389

(22) Filed: Aug. 25, 2014

(65) Prior Publication Data
US 2014/0365703 A1 Dec. 11, 2014

Related U.S. Application Data

(63) Continuation of application No. PCT/JP2013/006457, filed on Oct. 31, 2013.

(30) Foreign Application Priority Data

Nov. 8, 2012 (JP) .................................. 2012-246474

(51) Int. Cl.
*G06F 13/40* (2006.01)
*H04L 12/40* (2006.01)
(Continued)

(52) U.S. Cl.
CPC ......... *G06F 13/4027* (2013.01); *H04L 12/403* (2013.01); *H04L 12/4013* (2013.01); *H04L 47/13* (2013.01); *Y02B 60/31* (2013.01)

(58) Field of Classification Search
USPC ........................................ 710/307, 309, 316
See application file for complete search history.

(56) References Cited

U.S. PATENT DOCUMENTS 5,263,139 A * 11/1993 Testa .................... G06F 13/4022
710/307
5,276,893 A * 1/1994 Savaria ................. G06F 11/181
712/33

(Continued)

FOREIGN PATENT DOCUMENTS

JP 2009-049742 A 3/2009
JP 2009-118469 A 5/2009

OTHER PUBLICATIONS

A.Yoshida et al., "Proposal of load equalization methods for distributed bus", IPSJ SIG Technical Report, vol. 2011-ARC-196, No. 7, Aug. 2011, pp. 1-8.

(Continued)

*Primary Examiner* — Paul R Myers
(74) *Attorney, Agent, or Firm* — Renner, Otto, Boisselle & Sklar, LLP

(57) ABSTRACT

An exemplary semiconductor circuit bus system includes: a first bus comprised of distributed buses and having a first transfer rate; a second bus with a second transfer rate higher than the first transfer rate; a transmission node; a bus interface (IF) to connect the transmission node to the first bus; a router which connects the first and second buses; and a reception node connected to the second bus. The bus IF controls the flow rate of data flowing through the transmission routes of the first bus by reference to information about the amounts of transmissible data of the transmission routes. The router allocates the amounts of transmissible data to the transmission routes of the first bus and provides information about the amounts of transmissible data of the transmission routes for the bus IF and also controls the flow rate of the data flowing through the second bus.

12 Claims, 22 Drawing Sheets

(51) Int. Cl.
*H04L 12/403* (2006.01)
*H04L 12/801* (2013.01)

(56) References Cited

U.S. PATENT DOCUMENTS

| | | | | | |
|---|---|---|---|---|---|
| 5,377,189 | A | * | 12/1994 | Clark | H04L 12/64 370/462 |
| 5,768,270 | A | * | 6/1998 | Ha-Duong | H04L 12/5601 370/388 |
| 5,796,964 | A | * | 8/1998 | Bass | G06F 13/36 710/305 |
| 5,901,332 | A | * | 5/1999 | Gephardt | G06F 13/4018 710/116 |
| 6,041,380 | A | * | 3/2000 | LaBerge | G06F 13/4054 710/105 |
| 6,052,752 | A | * | 4/2000 | Kwon | G06F 13/4018 710/306 |
| 6,574,687 | B1 | * | 6/2003 | Teachout | G06F 3/0614 710/38 |
| 6,618,777 | B1 | * | 9/2003 | Greenfield | G06F 13/1605 710/120 |
| 6,662,260 | B1 | * | 12/2003 | Wertheim | G06F 13/4022 710/316 |
| 6,769,046 | B2 | * | 7/2004 | Adams | G06F 15/7832 710/316 |
| 7,085,875 | B1 | * | 8/2006 | Yona | G06F 13/409 370/233 |
| 2002/0129188 | A1 | * | 9/2002 | Fleck | G06F 13/1678 710/316 |
| 2006/0224813 | A1 | * | 10/2006 | Rooholamini | H04L 12/5695 710/316 |
| 2009/0122746 | A1 | | 5/2009 | Chang et al. | |

OTHER PUBLICATIONS

M. Tonouchi et al., "Evaluation of Fast Reliable Transport Protocol on Multiple Paths", Technical Report of IEICE, NS2004-315, IN2004-315(Feb. 2005), pp. 349-352.

International Search report for corresponding International Application No. PCT/JP2013/006457, dated Jan. 16, 2014.

* cited by examiner

|  | ROUTE 1 | ROUTE 2 | ROUTE 3 |
|---|---|---|---|
| BM1 | 5 (MAIN ROUTE) | 0 | 0 |
| BM2 | 3 | 5 (MAIN ROUTE) | 4 |
| BM3 | 0 | 0 | 0 (MAIN ROUTE) |

BUS SYSTEM FOR SEMICONDUCTOR CIRCUIT

This is a continuation of International Application No. PCT/JP2013/006457, with an international filing date of Oct. 31, 2013, which claims priority of Japanese Patent Application No. 2012-246474, filed on Nov. 8, 2012, the contents of which are hereby incorporated by reference.

BACKGROUND

1. Technical Field

The present disclosure relates to a bus system for a semiconductor circuit.

2. Description of the Related Art

Portion (a) of FIG. 1 illustrates an example of a lumped bus control. In a conventional integrated circuit which performs such a lumped bus control, a number of bus masters and a memory are connected together with a single bus, and accesses to the memory by the respective bus masters are arbitrated by an arbiter. However, as the functionality of an integrated circuit has been further improved and as the number of cores in an integrated circuit has been further increased these days, the scale of the circuit has become even larger and the traffic flows running through the bus has gotten even more complicated. As a result, it has become increasingly difficult to design an integrated circuit by such a lumped bus control.

Meanwhile, semiconductor integrated circuits with distributed buses have been developed one after another lately by introducing parallel computerized connection technologies and network control technologies such as ATM (asynchronous transfer mode). Portion (b) of FIG. 1 illustrates an example of a distributed bus control. In a semiconductor integrated circuit with distributed buses, a number of routers are connected together with multiple buses. Recently, people have been working on a so-called "Network on Chip (NoC)" in which the traffic flows in a large-scale integrated circuit are transmitted through a number of buses by adopting the distributed buses such as the ones shown in Portion (b) of FIG. 1.

However, even on an NoC which performs such a distributed bus control, the traffic flows running through the buses tend to increase so much that there is a growing demand for improved bus transmission performance. To maintain sufficient bus transmission performance, a method for speeding up the transmission by using a number of parallel transmission lines as the traffic flow increases may be adopted.

Japanese Laid-Open Patent Publication No. 2009-49742 discloses a general communications system in which a plurality of communications terminals communicate with each other over a network compliant with the Ethernet™ standard while sharing the same transmission lines with each other. As a method for speeding up the transmission using the transmission lines in parallel, Japanese Laid-Open Patent Publication No. 2009-49742 proposes a communications scheme for realizing broadband communications by making a single transmission terminal use multiple transmission lines.

FIG. 2 illustrates a configuration for the communications system disclosed in Japanese Laid-Open Patent Publication No. 2009-49742. In this communications system, transmission terminals illustrated on the left-hand side of transmission lines and reception terminals illustrated on the right-hand side of the transmission lines communicate with each other at higher speeds through a plurality of transmission lines.

According to conventional technologies, the communications quality of each transmission line is measured as a round trip time (RTT). If the RTT is long, the decision is made that the transmission line is congested, and therefore, the transmission rate is lowered. On the other hand, if the RTT is short, the decision is made that the transmission line is uncongested, and therefore, the transmission rate is raised. That is why since transmission and congestion control are supposed to be carried out continuously according to the conventional technologies until the transmission lines are too congested to avoid a breakdown, it is difficult to transmit data while maintaining expected transmission quality (see Japanese Laid-Open Patent Publication No. 2009-49742 and Evaluation of Fast Reliable Transport Protocol on Multiple Paths, IEICE Technical Report, February, 2005).

In a general network which uses the Ethernet™, for example, if any breakdown such as packet overflow happens at a buffer in a router, the router will discard those packets automatically. On the other hand, unlike the general network, no routers in an NoC will discard packets. The reason is that in an NoC, it is determined in advance what bus masters are to be connected to the network and it is possible to predict how much traffic flow data will run through the network, and therefore, the NoC can be designed so as to avoid discarding packets.

That is why the techniques that have been applied to the general network cannot be applied as they are to an NoC. It is difficult to speed up the transmission by using a number of transmission lines in parallel by the conventional technologies in order to maintain sufficient transmission performance for the bus.

SUMMARY

The NoC is also required to further increase the data transmission efficiency in order to maintain bus' transmission performance.

A non-limiting exemplary embodiment of the present application provides a technique for transmitting packets efficiently through an NoC in which multiple nodes on an integrated circuit are connected together with buses and in which a distributed bus control is carried out.

One aspect of the present invention provides a bus system for a semiconductor circuit. The system includes: a first bus which has a first transfer rate; a second bus which has a second transfer rate that is higher than the first transfer rate; a first node which transmits data; a bus interface which connects the first node to the first bus; a router which connects the first and second buses together; and a second node which is connected to the second bus and which receives the data. The first bus is comprised of distributed buses which have multiple transmission routes leading from the bus interface to the router. The bus interface includes: a transfer processor which transfers the data that has been received from the first node to the respective transmission routes of the first bus; and a first controller which controls the flow rate of the data flowing through the respective transmission routes of the first bus by reference to the information that has been provided by the router about the amounts of transmissible data of the respective transmission routes. The router includes: an allocator which allocates, in accordance with a predetermined reference, the amounts of transmissible data to the respective transmission routes of the first bus and which provides information about the amounts of transmissible data of the respective transmission routes for the bus interface; a router processor which receives the data flowing through the respective transmission routes of the first bus and transfers the data to the second bus; and a second controller which controls the flow rate of the data flowing through the second bus.

This general and particular aspect can be implemented as a system, a method, a computer program or a combination thereof.

Even if multiple buses with mutually different transfer rates are connected together when data is going to be transmitted through a semiconductor system, a bus system for a semiconductor circuit according to an aspect of the present invention can still reduce congestion on the buses and can broaden the operating band of the buses with the buses' operating frequencies kept relatively low.

These general and specific aspects may be implemented using a system, a method, and a computer program, and any combination of systems, methods, and computer programs.

Additional benefits and advantages of the disclosed embodiments will be apparent from the specification and Figures. The benefits and/or advantages may be individually provided by the various embodiments and features of the specification and drawings disclosure, and need not all be provided in order to obtain one or more of the same.

BRIEF DESCRIPTION OF THE DRAWINGS

Portion (a) of FIG. 1 illustrates an example of a lumped bus control, and portion (b) of FIG. 1 illustrates an example of a distributed bus control.

Figure 25:
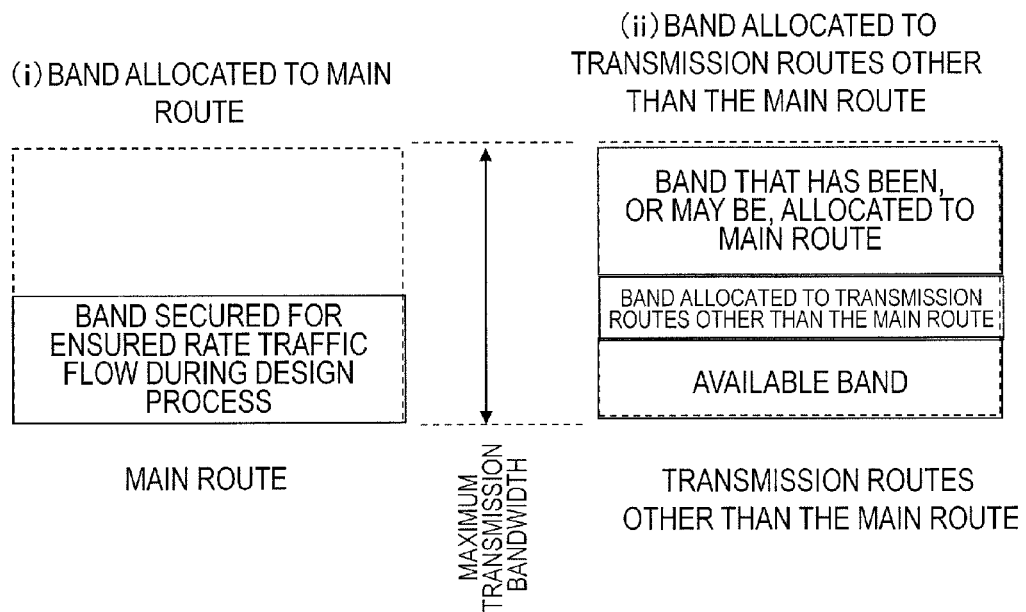

Portion (i) of FIG. 25 shows how bands are allocated to the main route and Portion (ii) of FIG. 25 shows how bands are allocated to transmission routes with available bands, other than the main route.

Figure 26:
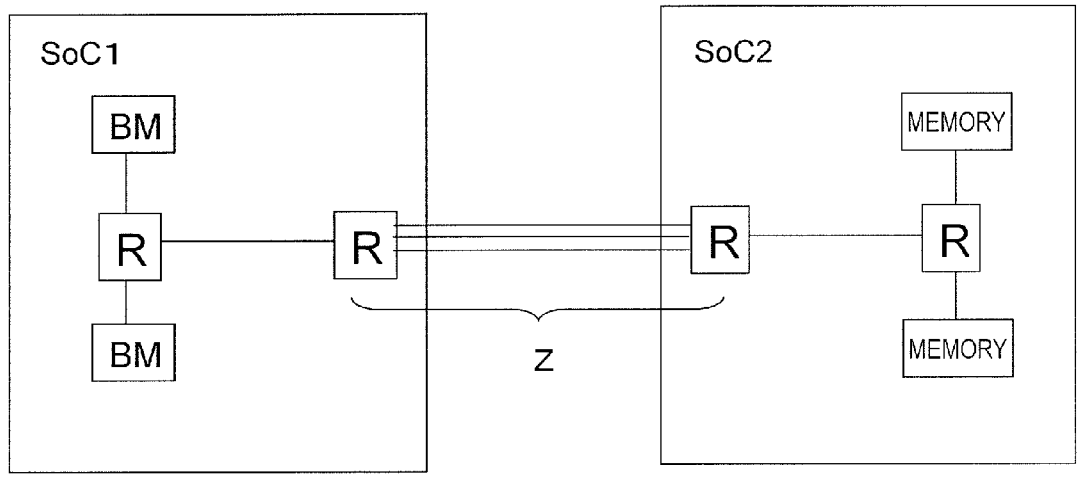

FIG. 26 illustrates an example in which the present disclosure is applied to a situation where multiple SoCs are connected together.

DETAILED DESCRIPTION

The present inventors studied the problems with the conventional technologies described above.

To maintain the transmission performance of an NoC bus in which a plurality of nodes on an integrated circuit are connected together with buses to carry out a distributed bus control, as the traffic flow increases, either the buses' operating frequency or their width needs to be increased. However, if the buses' operating frequency is raised, the power dissipation will increase. On the other hand, if the buses' width is broadened, then the lines will get congested easily.

As an approach to overcoming these problems, a configuration for changing the bus' width or operating frequency according to the type of the given functional block (which may be a video block, an audio block or a peripheral block, for example) has been adopted. For example, a semiconductor bus system including local buses, each of which is comprised of functional block units, and a system bus which connects those functional blocks together has been established. By providing the system bus, data on a memory can be shared by either multiple functional blocks or multiple bus masters. In such a configuration, the operating frequency of the local buses is set to be lower than that of the system bus. That is to say, the transfer rate of the local buses becomes relatively low, and the operating rate of the system bus becomes relatively high. In this manner, the buses' transmission performance can be maintained in an NoC.

In such a semiconductor bus system, however, data processing will easily get delayed at a node where the local buses and the system bus are connected due to the gap between their transmission bandwidths. In addition, on the system bus, traffic flows running through the local buses will often interfere with each other, thus incessantly changing the maximum traffic flow that can be transmitted per unit time. For these reasons, congestion is likely to occur at a router which connects system and local buses, on the local buses, and on the system bus. Consequently, when a traffic flow needs to be transmitted through buses with different levels of transmission performances, it is difficult to maintain sufficiently high transmission performance (in terms of throughput and delay).

Thus, the present disclosure provides a technique for broadening the bus' operating bandwidth using multiple transmission routes with the expected transmission quality maintained for a network model which shares the same transmission route between multiple transmission nodes and in which multiple buses with mutually different transfer rates are connected together.

An aspect of the present invention can be outlined as follows:

A bus system according to an aspect of the present invention is designed to be used in a semiconductor circuit. The bus system includes: a first bus which has a first transfer rate; a second bus which has a second transfer rate that is higher than the first transfer rate; a first node which transmits data; a bus interface which connects the first node to the first bus; a router which connects the first and second buses together; and a second node which is connected to the second bus and which receives the data. The first bus is comprised of distributed buses which have multiple transmission routes leading from the bus interface to the router. The router includes: an allocator which allocates, in accordance with a predetermined reference, the amounts of transmissible data to the respective transmission routes of the first bus and which provides information about the amounts of transmissible data of the respective transmission routes for the bus interface; a router processor which receives the data flowing through the respective transmission routes of the first bus and transfers the data to the second bus; and a second controller which controls the flow rate of the data flowing through the second bus. The bus interface includes: a transfer processor which transfers the data that has been received from the first node to the respective transmission routes of the first bus; and a first controller which controls the flow rate of the data flowing through the respective transmission routes of the first bus by reference to the information that has been provided by the router about the amounts of transmissible data of the respective transmission routes.

In one exemplary embodiment, the second controller controls the flow rate of the data flowing through the second bus based on the throughputs of the respective transmission routes of the first bus and the throughput of the second bus.

In another exemplary embodiment, the transfer processor of the bus interface packetizes the data that has been received from the first node into packets and then transfers the packets to the respective transmission routes of the first bus. Information about the upper limit of the number of packets that can be transmitted through the respective transmission routes of the first bus has been defined in advance as the predetermined reference. And the allocator of the router allocates the amounts of transmissible data to the respective transmission routes in accordance with the information about the upper limit.

In another exemplary embodiment, the transfer processor of the bus interface packetizes the data that has been received from the first node into packets and then transfers the packets to the respective transmission routes of the first bus. The allocator of the router allocates the amounts of transmissible data to the respective transmission routes in accordance with the throughputs of the respective transmission routes of the first bus as the predetermined reference.

In another exemplary embodiment, the transfer processor of the bus interface packetizes the data that has been received from the first node into packets and then transfers the packets to the respective transmission routes of the first bus. The allocator of the router allocates the amounts of transmissible data to the respective transmission routes by reference to not only the information about the upper limit of the number of packets but also information about the throughputs of the respective transmission routes of the first bus as the predetermined reference.

In another exemplary embodiment, the allocator of the router allocates the amounts of transmissible data to the respective transmission routes based on the ratio of the throughputs of the respective transmission routes to the throughputs of all of the transmission routes of the first bus.

In another exemplary embodiment, the second node is able to transmit data to the first node, and the router processor transfers the data that has been received from the second node to the first node through the first bus.

In another exemplary embodiment, the router processor transfers the data that has been received from the second node to the first node through the multiple transmission routes of the first bus.

A bus system according to another aspect of the present invention is designed to be used in a semiconductor circuit. The system includes: a first bus which has a first transfer rate; a second bus which has a second transfer rate that is higher than the first transfer rate; a plurality of first nodes, each of which transmits data; a plurality of bus interfaces, each of which connects an associated one of the first nodes to the first bus; a router which connects the first and second buses together; and at least one second node which is connected to the second bus and which receives the data. The first bus is comprised of distributed buses which have multiple transmission routes leading from the bus interfaces to the router. The router includes: an allocator which allocates, in accordance with a predetermined reference, the amounts of transmissible data to the respective transmission routes of the first bus and which provides information about the amounts of transmissible data of the respective transmission routes for the bus interfaces; a router processor which receives the data flowing through the respective transmission routes of the first bus and transfers the data to the second bus; and a second controller which controls the flow rate of the data flowing through the second bus and which aggregates together multiple sets of data that have been received from the plurality of first nodes so as to guarantee an ensured transfer rate for each of the first nodes and then transmits the data to the second node. Each of the bus interfaces includes: a transfer processor which transfers the data that has been received from the first node connected to the respective transmission routes of the first bus; and a first controller which controls the flow rate of the data flowing through the respective transmission routes of the first bus by reference to information about a transmission bandwidth which is limited based on the transfer rate to be guaranteed and information about the amounts of transmissible data of the respective transmission routes that has been provided by the router.

In one exemplary embodiment, the transmission bandwidth that is limited based on the transfer rate to be guaranteed is limited by either the router or another router that is different from the former router.

A bus system according to still another aspect of the present invention is designed to be used in a semiconductor circuit. The system includes: a first bus which has a first transfer rate; a second bus which has a second transfer rate that is lower than the first transfer rate; a third bus which has a transfer rate that is higher than the second transfer rate of the second bus; a first node which transmits data; a bus interface which connects the first node to the first bus; a first router which connects the first and second buses together; a second router which connects the second and third buses together; and a second node which is connected to the third bus and which receives the data. The first bus is comprised of distributed buses which have multiple transmission routes leading from the bus interface to the router. The first router includes: an allocator which allocates, in accordance with a predetermined reference, the amounts of transmissible data to the respective transmission routes of the first bus and which provides information about the amounts of transmissible data of the respective transmission routes for the bus interface; a router processor which receives the data flowing through the respective transmission routes of the first bus and transfers the data to the second bus; and a second controller which controls the flow rate of the data flowing through the second bus. The second router includes: a router processor which receives the data flowing through the respective transmission routes of the second bus and transfers the data to the third bus; and a second controller which controls the flow rate of the data flowing through the third bus. The bus interface includes: a transfer processor which transfers the data that has been received from the first node to the respective transmission routes of the first bus; and a first controller which controls the flow rate of the data flowing through the respective transmission routes of the first bus by reference to the information that has been provided by the first router about the amounts of transmissible data of the respective transmission routes.

Hereinafter, embodiments of a transmission system and transmission method according to the present disclosure will be described with reference to the accompanying drawings.

In the following description, the "bus master" will refer herein to a processor or a node which performs arithmetic processing such as image processing. The bus master has the function of transmitting a traffic flow, and therefore, will be sometimes referred to herein as a "transmission node". Meanwhile, the "slave" will refer herein to a memory (including a memory controller) or an I/O, for example. The slave has the function of receiving a traffic flow, and therefore, will be sometimes referred to herein as a "reception node" or a "destination node". In the following description of embodiments, the slave is supposed to be a memory.

<1. System Configuration>

Figure 1:
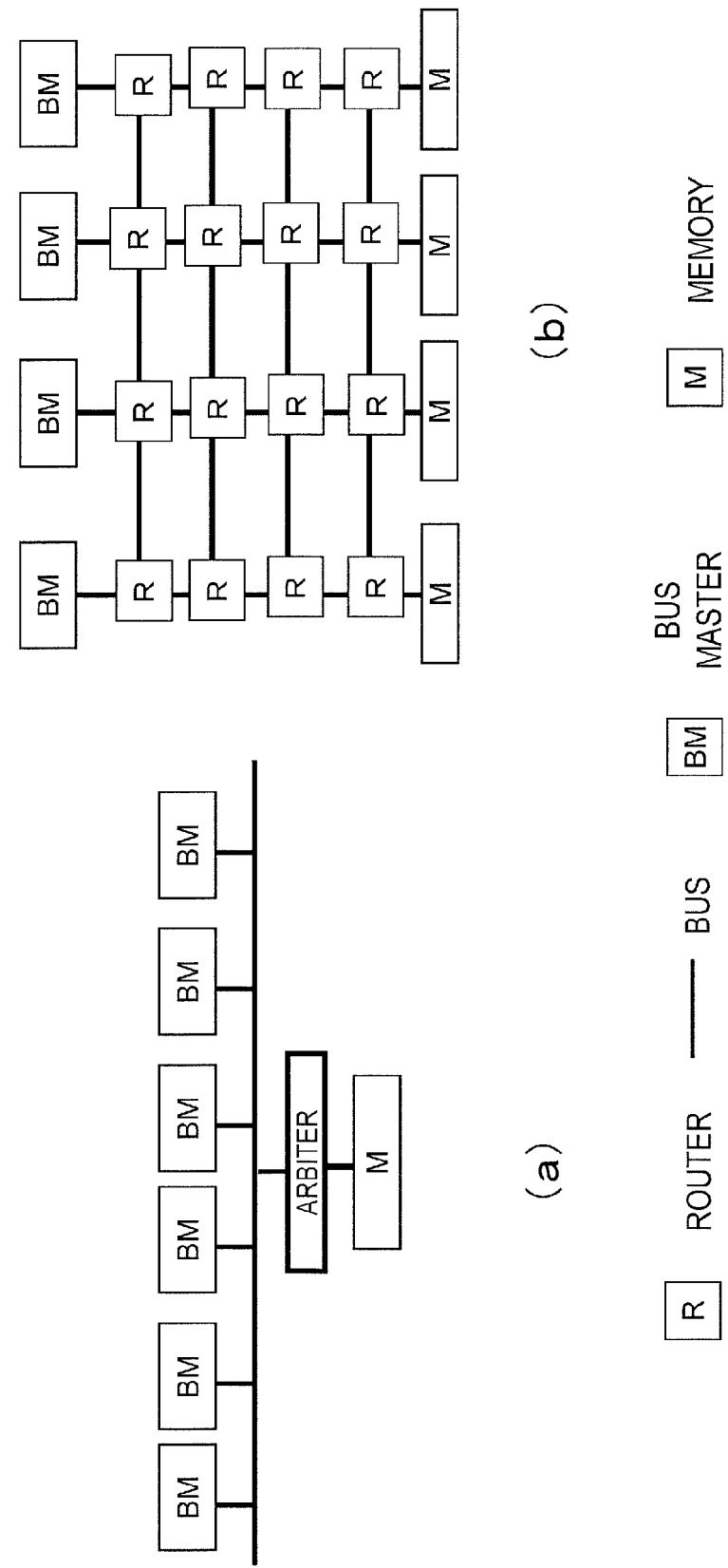
Figure 2:
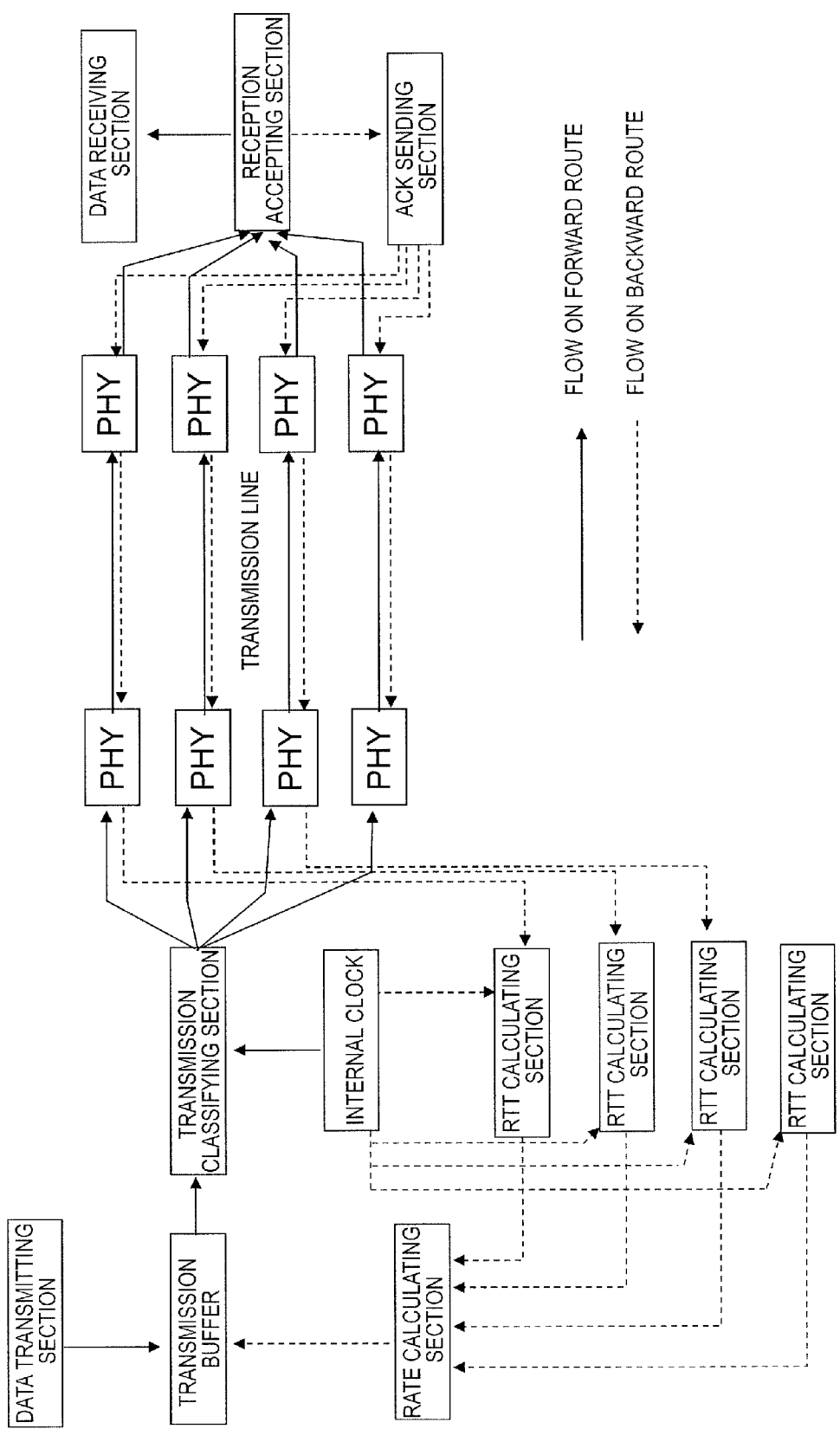
FIG. 2 illustrates a configuration for the communications system disclosed in Japanese Laid-Open Patent Publication No. 2009-49742.
Figure 3:
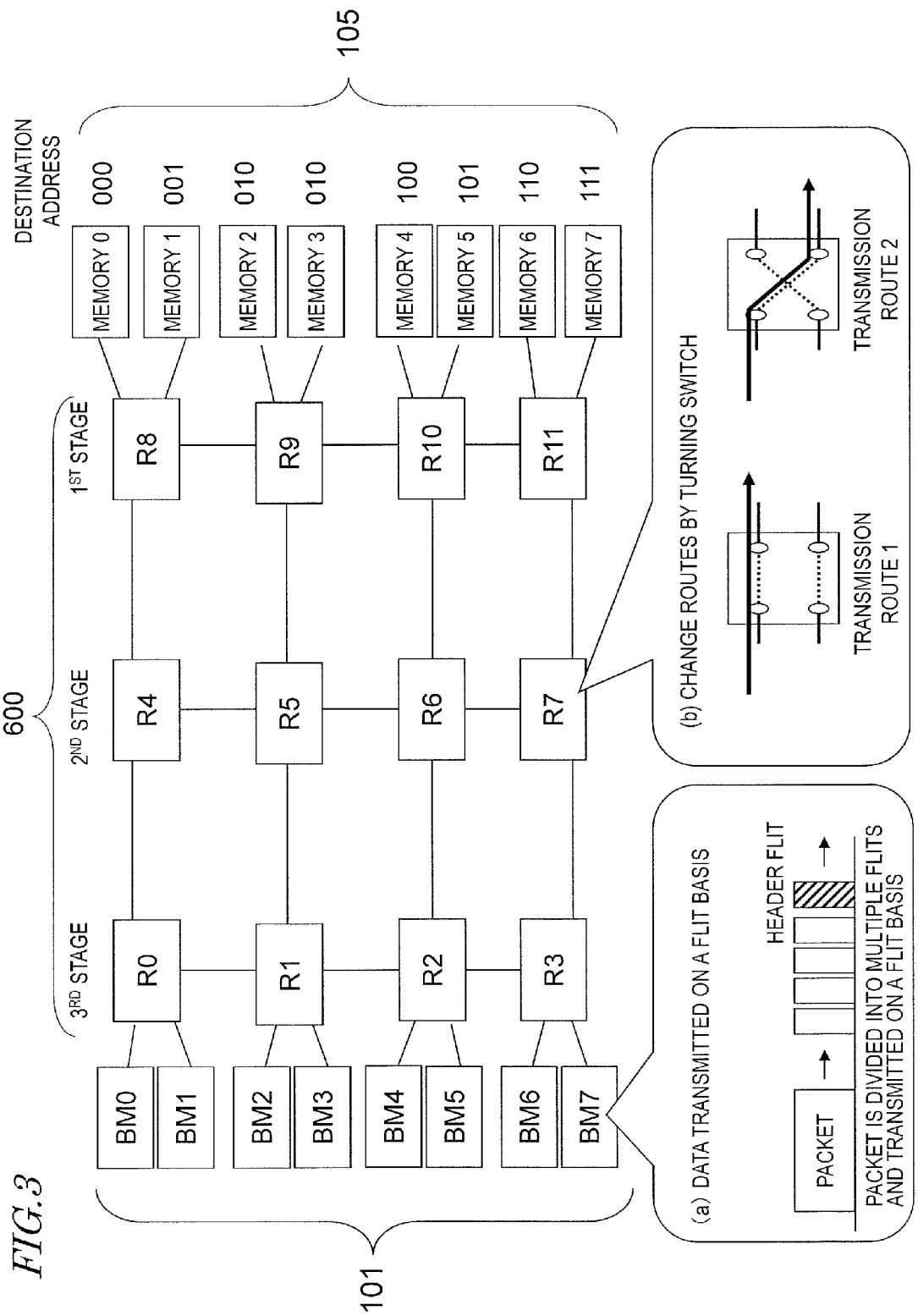
FIG. 3 illustrates an exemplary configuration for a transmission system according to an exemplary embodiment.

FIG. 3 illustrates an exemplary configuration for a transmission system according to this embodiment. The system shown in FIG. 3 includes eight bus masters (BMs) 101 as transmission nodes and eight memories 105 as reception nodes. These bus masters 101 and memories 105 are connected together in multiple stages with buses via twelve routers 600. The network architecture shown in FIG. 3 is a so-called "mesh network".

In this manner, the transmission system shown in FIG. 3 forms a multistage interconnection network (MIN).

In this embodiment, the bus masters 101 are devices which can perform a data transfer control using a bus and may be processors or DSPs, for example. On the other hand, the memories 105 may be semiconductor memories such as DRAMs or SRAMs. Alternatively, in another embodiment of the present disclosure, the memories 105 may also be arranged so as to connect together non-memory nodes such as processors, DSPs and I/Os. The routers 600 may be implemented as semiconductor circuits, for example, and have the function of relaying data to be transmitted between these bus masters 101 and memories 105.

Data is transmitted from a bus master 101 to a memory 105 by the packet exchange method. As shown in portion (a) of FIG. 3, each bus master is supposed to divide a packet to transmit into the smallest units called "flits" and then transmits them to an adjacent router. The first one of those flits obtained by dividing one packet, which is transmitted earlier than any other flit, is called a "header flit", in which described are flag information indicating that this is the head of a packet and the address information of the packet's destination. The data structures of packets and flits according to this embodiment will be described in detail later.

Each of those routers that form parts of the multistage interconnection network shown in FIG. 3 includes a crossbar switch with two inputs and two outputs. Each router can change the input and output combinations by turning the crossbar switch as shown in portion (b) of FIG. 3. In this manner, the traffic flow can pass selectively through one of the two transmission routes (Transmission Routes #1 and #2). It should be noted that if the destinations cannot be reached unless both of these two transmission routes are taken, then the router may output the two traffic flows through both of the two transmission routes at the same time. In this multistage interconnection network, by turning the crossbar switch at each router, one or more transmission routes can always be formed between every bus master and every memory.

The mesh network can adopt a communications method for broadening the transmission bandwidth by making a single transmission node use multiple transmission routes as needed while sharing the same transmission route in multiple transmission nodes. Even though the mesh network is supposed to be used in this embodiment, this is just an example. Rather, the present disclosure is also applicable even if the configuration of the integrated circuit has any other topology (such as a butterfly network).

<2. Packet and Flit Formats>

Hereinafter, the structures of packets and flits according to this embodiment will be described. It should be noted that although packets or flits are supposed to be used in this embodiment, to transmit data in the packet form is just a matter of design. Thus, the same statement also applies even if those packets or flits are generalized and simply called "data".

Figure 4:
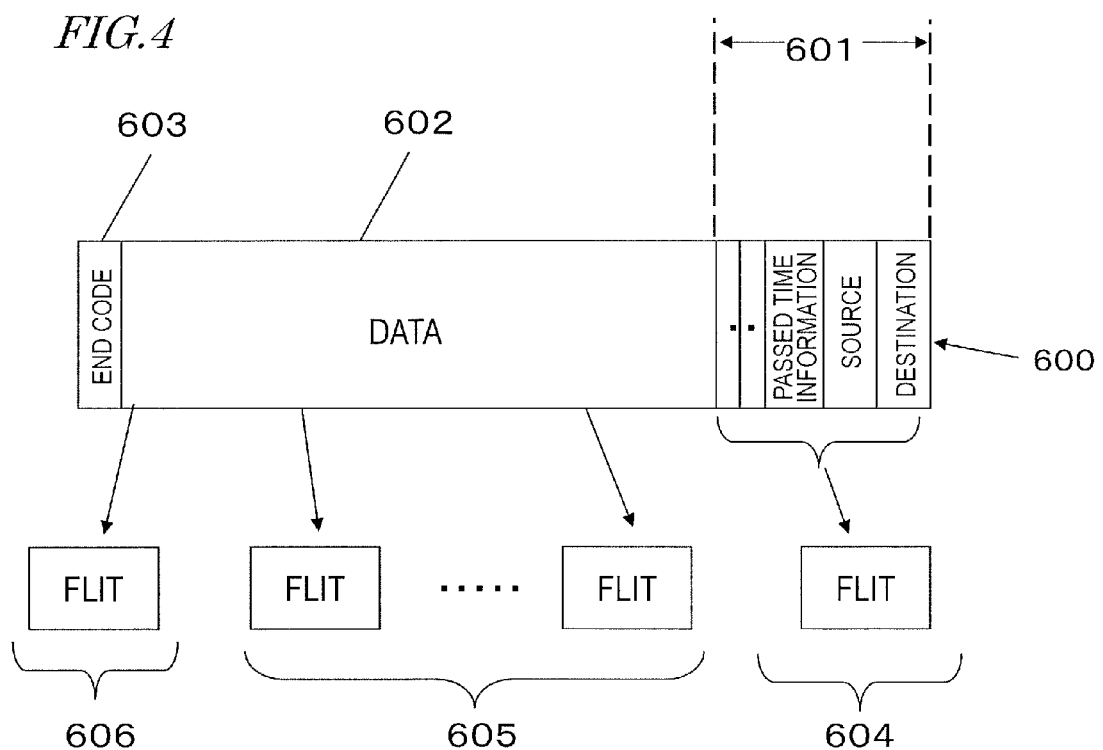
FIG. 4 illustrates an exemplary transmission format for a packet 600 and how the packet 600 may be divided into a plurality of flits.

FIG. 4 illustrates an exemplary transmission format for a packet 600 and how the packet 600 may be divided into a plurality of flits. The packet 600 includes a header field 601, a data field 602, and a control code field 603.

In the header field 601, described are the destination address, the source address, and information indicating the amount of time that has passed since the packet was transmitted (which will be referred to herein as "passed time information"). The passed time information may be described in any form as long as the value tells how much time has passed since the packet was transmitted. For example, a time when the packet was transmitted, the amount of time that has passed since the packet was transmitted, or the number of routers that the packet has passed through (i.e., the number of hops) may be described. For example, every time each router relays a given packet 600, the router may either increment the number of hops by one or decrement a predetermined maximum number of hops one by one sequentially.

Any other kind of information may be described in the header field 601. Among those kinds of data in the header field 601, the destination address and the source address are used to perform the processing of relaying the packet 600 and the processing of receiving the packet 600 at the receiving end.

In the data field 602, described are video data and audio data, for example. In the control code field 603, a predetermined end code for the packet 600 may be described, for example. By detecting the end code, the router can find the end of the packet 600. In the control code field 603, any kinds of information other than the end code may also be stored.

As described above, the bus master 101 on the transmitting end transmits the packet 600 after having broken down the packet 600 into smaller packet units called "flits". The size of one flit is determined by the width of the bus so that one flit can be transmitted in one cycle through the bus. The packet 600 is divided into a header flit 604, a plurality of data flits 605 and a tail flit 606.

In the header flit 604, flag information and destination address information that are stored in the header field 601 may be included.

In the flits that follow the header flit 604 (namely, the data flits 605 and the tail flit 606), no address information that specifies the destination is stored. The reason is that those flits following the header flit 604 are sent to the same destination as the header flit's 604. When the destination is determined by the header flit 604 and when it is determined what output buffer 606 will output the flit of that traffic flow, the flits that follow it will be transmitted to the destination specified by the header flit 604 using the same output buffer 606 as the header flit's 604.

To the tail flit 606, attached is flag information indicating that this is the last one of the flits that form that packet (i.e., an end code stored in the control code field 603). The flits 605 other than the header flit 604 and the tail flit 606 are flits that are used mainly to transmit data (i.e., data flits) and correspond to the data field 602 of the packet 600.

On detecting the flag information (i.e., the end code) that is described in the tail flit 606, the memory 105 on the receiving end restores those flits transmitted into the original packet based on that end code.

For example, one packet may have a size of 128 bytes and one flit may have a size of 32 or 64 bits. It should be noted, however, that the one packet and one flit sizes could vary according to the intended application and these are nothing but examples. Optionally, the length of one flit may be basically defined to be long enough to describe control data such as the destination address and the source address.

As will be described later, each of the routers includes a buffer that accumulates the incoming flits. Those flits are once accumulated in the buffer and then transmitted to either a router leading to the destination memory or directly to the destination memory itself by turning the switch.

<3. Router's Configuration and Operation>
<3.1. General Configuration for Router>

Figure 5:
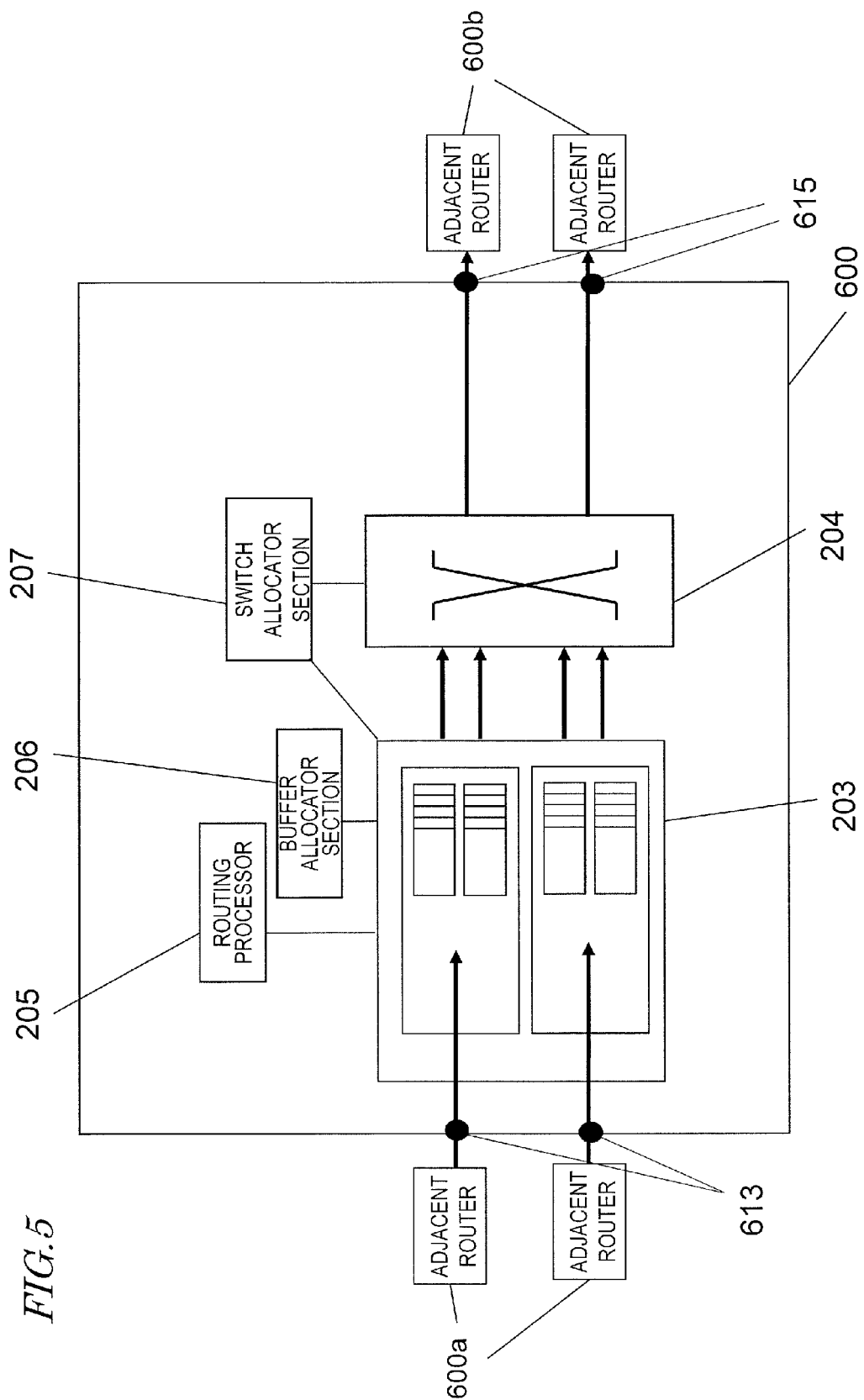
FIG. 5 illustrates a configuration for a router 600 according to an exemplary embodiment.
Figure 6:
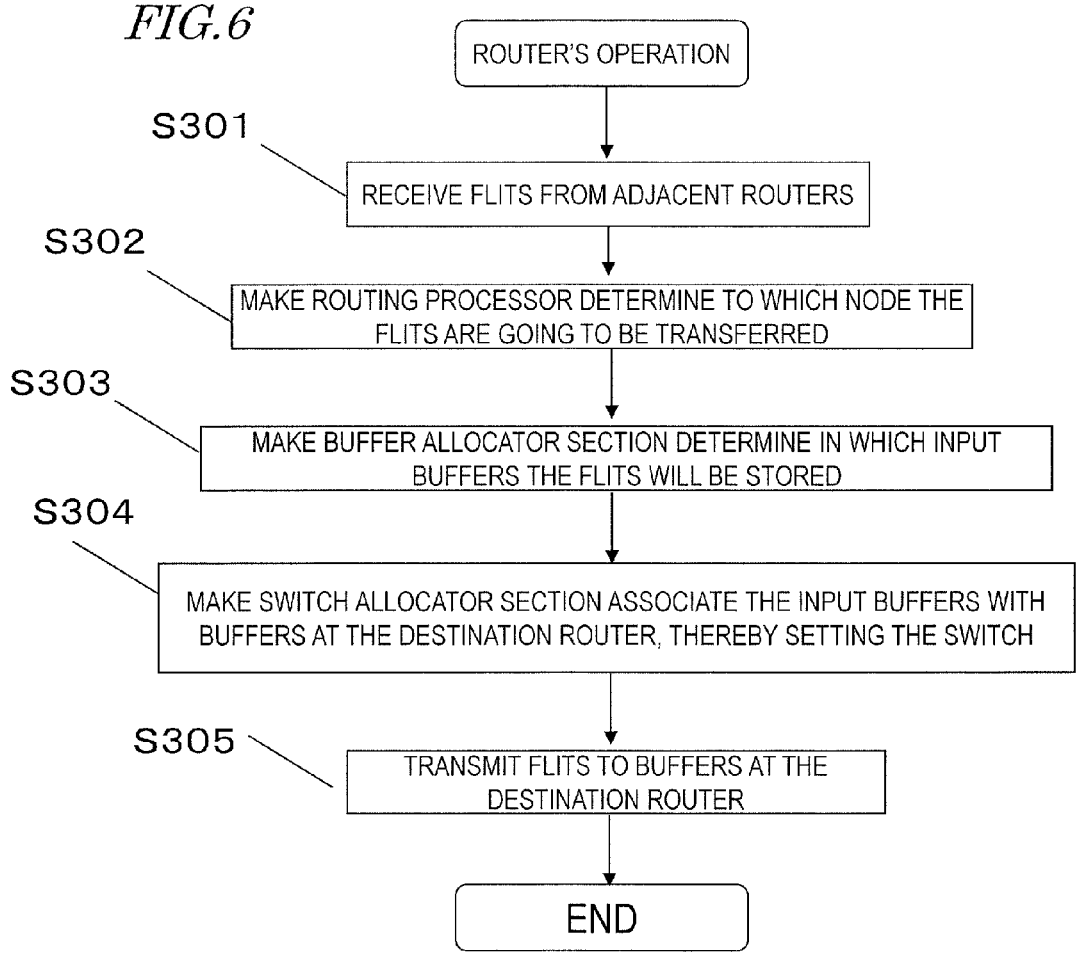
FIG. 6 is a flowchart showing the procedure of operation of the router 600.

FIG. 5 illustrates a configuration for a router 600. FIG. 6 is a flowchart showing the procedure of operation of the router 600.

The router 600 includes a plurality of input ports 613 and a plurality of output ports 615. The router 600 receives flits from (a group of) routers 600a on the previous stage through the input ports 613 and sends the flits to (a group of) routers 600b on the next stage through the output ports 615.

The router 600 includes input buffers 203, a switch 204, a routing processor 205, a buffer allocator section 206, and a switch allocator section 207. Hereinafter, the functions or operations of the respective components of this router 600 will be described by reference to the respective processing steps shown in FIG. 6.

First of all, the router 600 receives flits at the input ports 613 from the (group of) adjacent routers 600a and stores those received flits in the input buffers 203 (in Step S301). The routing processor 205 determines the node to which the flits are going to be transferred (in Step S302). Next, the buffer allocator section 206 determines in which input buffers of the (group of) adjacent routers 600b on the next stage the flits will be stored (in Step S303). The switch allocator section 207 associates the input buffers 203 with the buffers 203 at the destination router, thereby setting the switch (in Step S304). By getting the switch connected by the switch allocator section 207, the flits are transmitted to the buffers at the destination router 202 via the output ports 615 (in Step S305).

Optionally, the (groups of) adjacent routers 600a and 600b shown in FIG. 5 may be replaced with bus masters and/or memories.

Figure 7:
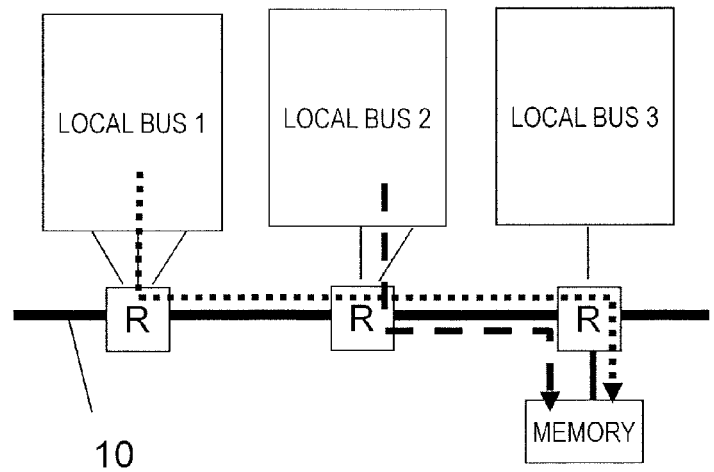
FIG. 7 illustrates specifically a relation between the local buses and the system bus.
Figure 8:
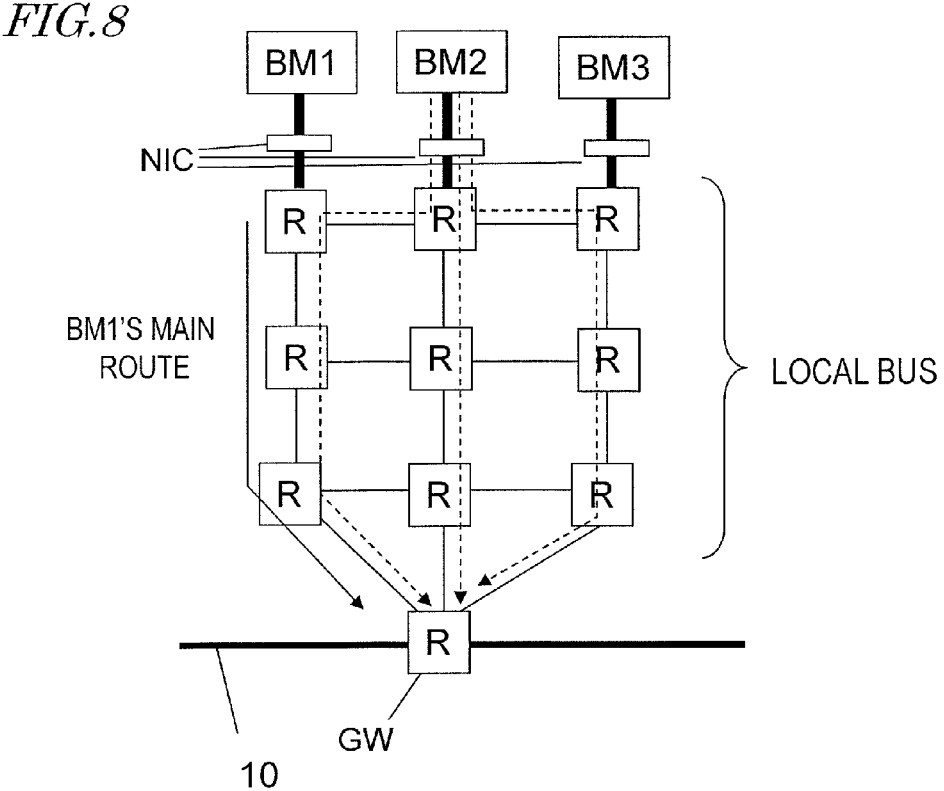
FIG. 8 illustrates a configuration for each of the local buses that are connected to the system bus 10.

FIGS. 7 and 8 illustrate specifically a relation between the local buses and the system bus.

As shown in FIG. 7, the semiconductor bus system includes a plurality of Local Buses #1, #2 and #3, and the system bus 10 that functions as a key route bus connects those local buses together. In other words, the single system bus 10 aggregates those Local Buses #1 to #3 together.

FIG. 7 also illustrates schematically an exemplary situation where interference has occurred between multiple traffic flows on the system bus 10. Since the system bus 10 aggregates those Local Buses #1 to #3 together, traffic flows running from the respective local buses toward the same memory sometimes interfere with each other on the system bus 10. The dotted arrow and dashed arrow shown in FIG. 7 represent respective traffic flows. Since those two traffic flows that are going to have access to the same memory interfere with each other on the system bus 10, the amount of the traffic flow that can be transmitted through the system bus 10 varies with time.

FIG. 8 illustrates a configuration for each of the local buses that are connected to the system bus 10. As already described with reference to FIG. 3, this local bus is implemented as a mesh type so that three bus masters BM1 to BM3 can share the same bus. An NIC (network interface controller), which is also called a "bus interface (I/F)", is provided to connect each bus master to its associated routers. The NIC packetizes the data that has been output from the bus master into packets, transmits the packets to the routers, de-packetizes the packets that have been received from the routers, and then transmits the data thus obtained to the bus master.

The NIC also determines whether or not data should be transmitted in parallel and controls the amounts of data that can be transmitted through the transmission routes. FIG. 8 schematically illustrates how a traffic flow may be transmitted through an available route. In the example illustrated in FIG. 8, the traffic flows of the data that has been output from the bus master BM2 is transmitted in parallel through three transmission routes. The three dotted arrows shown in FIG. 8 represent three different traffic flows. It should be noted that the transmission routes between the bus master BM2 and the NIC are supposed to have a bandwidth that is broad enough to transmit the three traffic flows simultaneously.

Each local bus is connected to the system bus 10 via a router GW. In order to adjust the difference in transfer rate between the system bus and the local buses, this router GW has a buffer with relatively large storage capacity. This router GW is sometimes called a "rate converting router".

A main route is defined in advance for each bus master. In this description, the "main route" refers herein to a transmission route to be used mostly by a bus master which is going to transmit a traffic flow to the router GW (gateway) that connects the system bus and the local bus together. As shown in FIG. 8, as for the bus master BM1, the shortest route leading from the bus master BM1 to the router GW is defined as the main route. In the example illustrated in FIG. 8, every bus master's main route is defined to the shortest route. Actually, however, the main route may also be defined arbitrary by the designer.

Depending on the number of transmission routes to be used for parallel transmission and according to the degree of traffic flow interference on the local buses or the system bus, the amount of the traffic flow that can be transmitted varies with time. If any particular bus master were transmitting too much traffic flow, then the amounts of the traffic flows that can be transmitted by the other bus masters would decrease too much to get the required processing done. That is why the amount of data that can be transmitted (which will be also referred to herein as an "amount of transmissible data") is defined for each bus master. That is to say, the "maximum number of packets that can be transmitted" is defined in advance for each bus master. Thus, each bus master can transmit a number of packets onto a network unless the number exceeds the maximum number of packets that can be transmitted. By defining the maximum number of packets that can be transmitted, the number of packets that can be transmitted continuously through a single transmission process can be limited.

If a bus master that has transmitted packets has received response packets responsive to those transmitted packets from a slave (which is a destination node), then the bus master can further transmit the same number of packets as the response packets received. Consequently, the number of packets to be transmitted from that bus master onto the transmission route should be at most equal to the maximum number of packets that can be transmitted. As a result, the transmission performance of the bus can be maintained and ensured in terms of throughput and delay, and it is possible to prevent the bus from getting congested by allowing a bus master to transmit a larger number of packets than expected.

As to whether or not packets should be transmitted through routes other than the main route and the maximum number of packets that can be transmitted, the router GW may decide at a time in response to transmission requests from the respective transmission routes and their amounts of transmissible data. Alternatively, such a decision may also be made dispersively by the respective NICs. In that case, the transmission requests from the respective transmission routes and information about the amounts of transmissible data may be exchanged between the respective NICs that are connected to the bus master. In this embodiment, as will be described later with reference to FIGS. 13 and 14, those decisions are supposed to be made by the router GW at a time.

Figure 9:
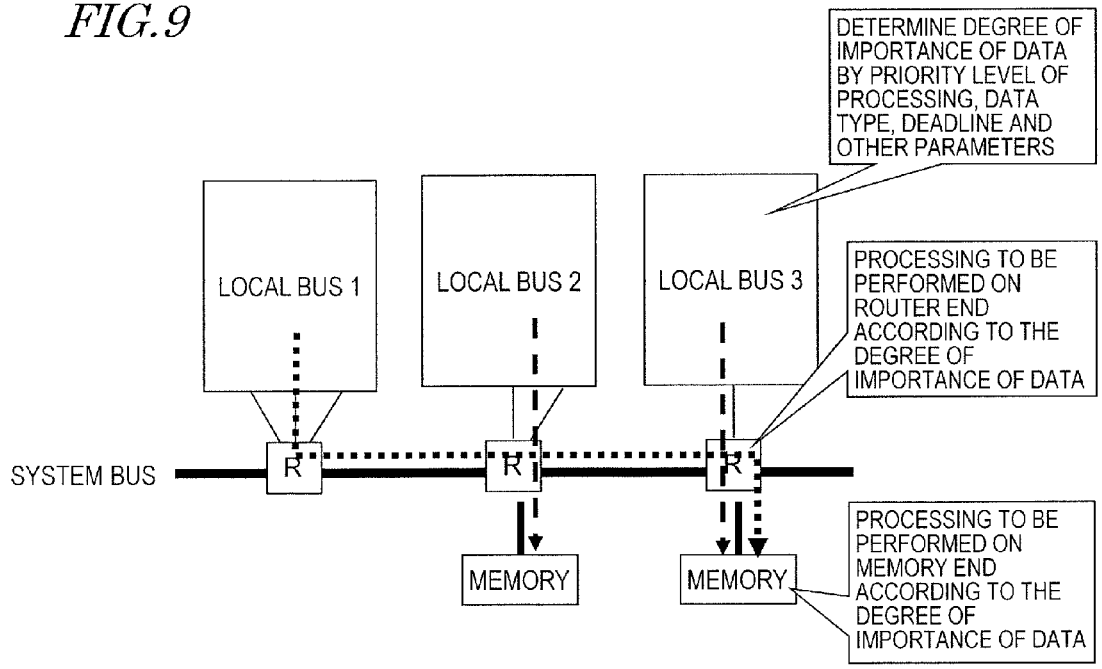
FIG. 9 schematically illustrates an exemplary situation where traffic flows are interfering with each other at memories and routers on the system bus.

FIG. 9 schematically illustrates an exemplary situation where traffic flows are interfering with each other at memories and routers on the system bus. That is to say, in FIG. 9, the traffic flow interference shown in FIG. 7 is occurring both at the routers and at the memories. The traffic flow interference is indicated by crossing between the traffic flows (represented by the dotted and dashed arrows and) transmitted from the respective local buses or by the congestion caused by multiple traffic flows being headed toward the same memory.

As described above, the amount of the traffic flow that can be transmitted through a router or memory on the system bus varies with time. That is why the degrees of importance of the traffic flows (data) to be transmitted are determined. The bus master on Local Bus #3 determines the degree of importance of the data to be transmitted by the priority level of processing, the data type, the deadline and other parameters. And based on this degree of importance, the order of priorities of the processing to be carried out at routers and memories that relay the traffic flows is determined. The processing time varies according to the amount of the traffic flows to be processed by the routers and the memories. As a result, the amount of traffic flows that can be transmitted varies with time. The same situation can also arise on the local buses. For example, the amount of the traffic flow that can be transmitted through a local bus varies with time depending on the memories and routers in the local bus.

Figure 10:
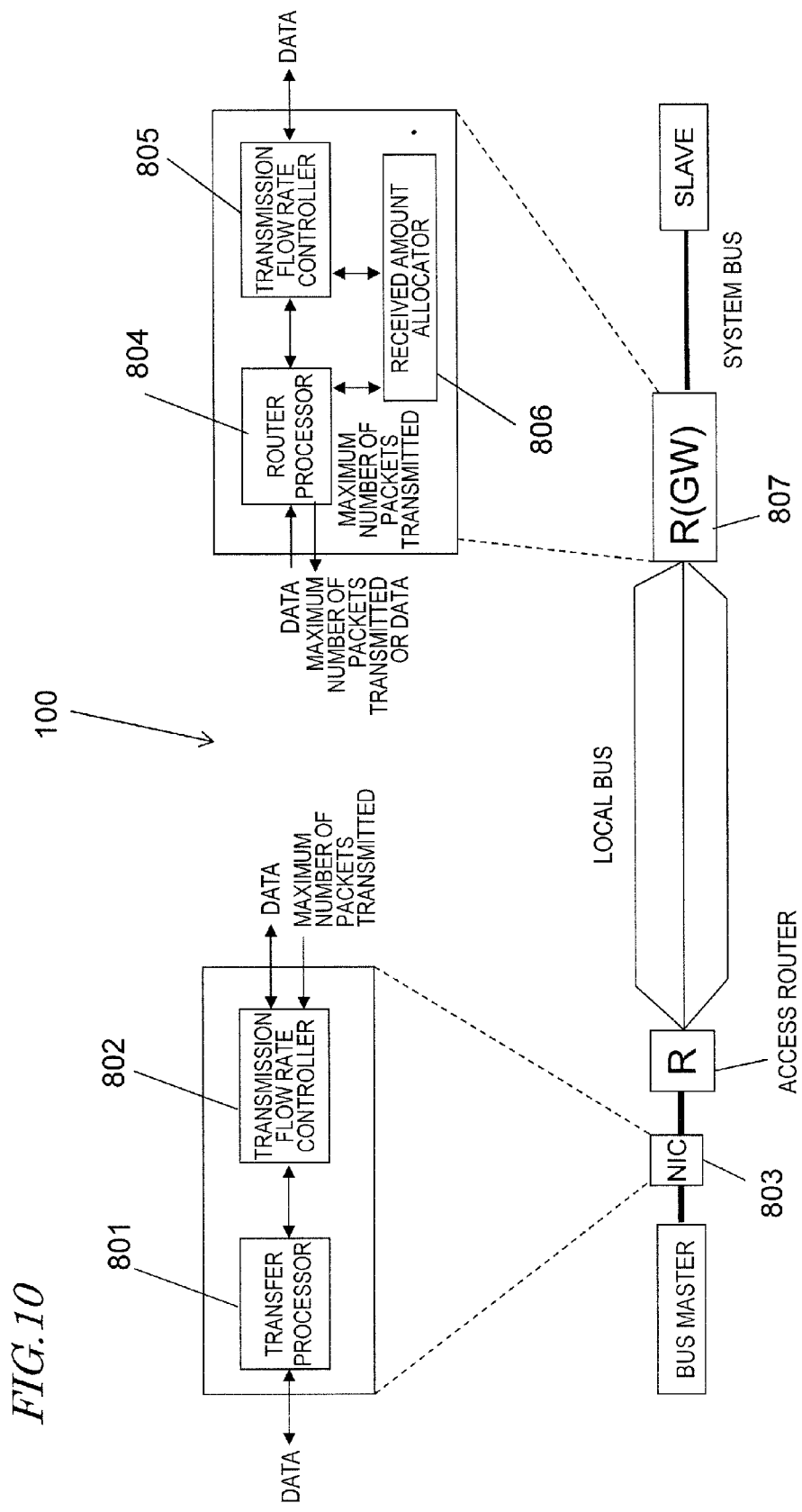
FIG. 10 illustrates a configuration for a semiconductor circuit bus system 100 according to an exemplary embodiment.

FIG. 10 illustrates a configuration for a semiconductor circuit bus system 100 according to this embodiment. This bus system 100 includes a bus master, an NIC 803, an access router, a router GW 807, and a slave. A local bus is arranged between the access router and the router GW 807.

The NIC 803 is provided to connect the bus master to the local bus, and includes a transfer processor 801 and a transmission flow rate controller 802.

The transfer processor 801 packetizes the data supplied from the bus master into packets and de-packetizes the packets that have come from the slave.

The transmission flow rate controller 802 controls the amount of data that can be transmitted through the transmission route. This control is also carried out when data is transmitted in parallel inside a local bus (see FIG. 8).

In this description, a router connected to the NIC 803 will be referred to herein as an "access router", and a router which connects the local bus and the system bus together will be referred to herein as a "gateway (GW)". In the following description, the latter router will be referred to herein as a "router GW".

The router GW includes a router processor 804 with a packet transfer function, a transmission flow rate controller 805 which controls the number of packets that can be transmitted onto the system bus, and a received amount allocator 806 which determines the amounts of transmissible data of the respective transmission routes in the local bus. Functions other than these will be described in detail later. The router processor 804 corresponds to the router configuration 203 to 207 shown in FIG. 5. Also, in this embodiment, every router (including the access router) but the router GW is supposed to have the general configuration shown in FIG. 5.

In the example illustrated in FIG. 10, the bus that connects the bus master to the router GW is supposed to be a local bus and the bus that connects the router GW to the slave is supposed to be a system bus. In general, the operating frequency of a system bus is set to be higher than that of a local bus.

In this example, the system bus is illustrated as a single bus for the sake of simplicity. However, just like the local buses, there may be a plurality of system buses through which traffic flows are transmitted to the same slave. That is to say, buses may be arranged to have an M to N topology. Such a topology can be adopted if the maximum number of packets that can be transmitted through multiple transmission routes in the system bus is calculated in the same way as the maximum number of packets that can be transmitted through the local buses, for example.

Furthermore, even though only one slave is illustrated in FIG. 10, multiple slaves may be provided as well. In that case, a plurality of system buses may be connected to each of those slaves. For example, there may be multiple memories as the slaves.

Furthermore, in FIG. 10, the router GW 807 is illustrated as being directly connected to the slave through the system bus. However, the slave may also be connected to the system bus via an NIC. In that case, the memory controller will correspond to a slave. The memory controller will be connected to the system bus via an NIC and the access to the memory will be made via the memory controller.

Figure 11:
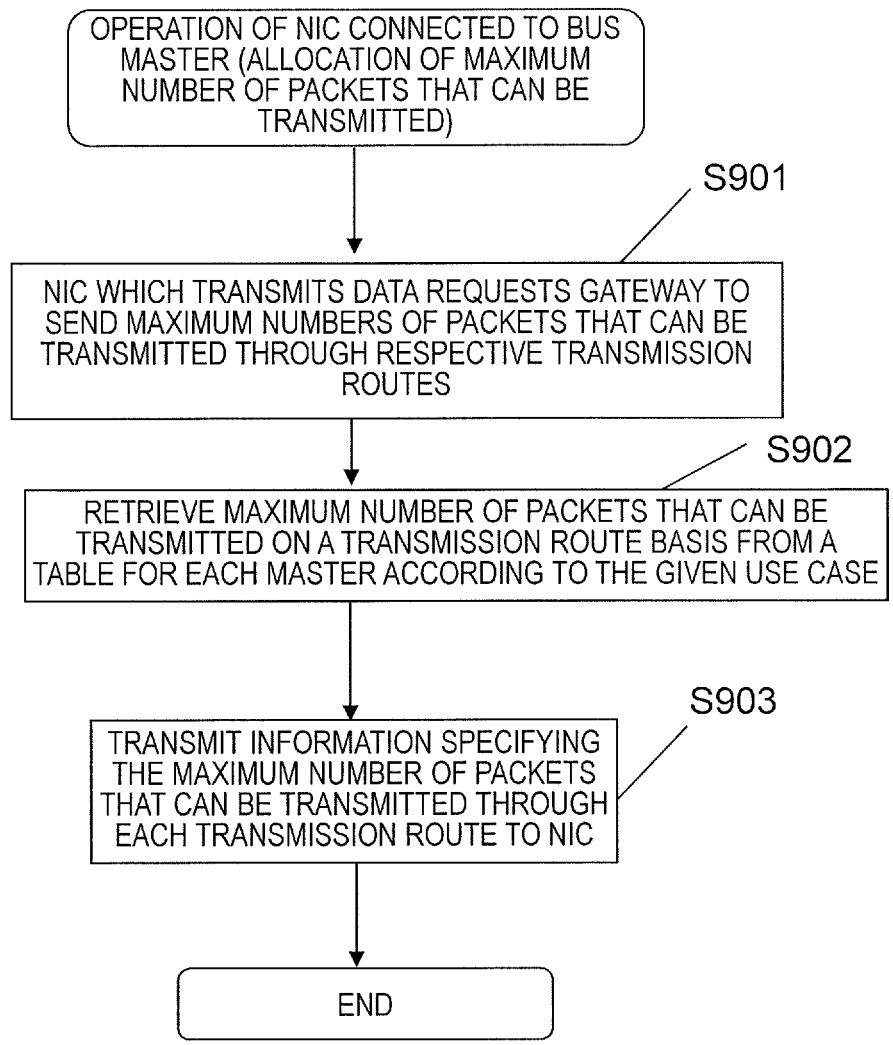
FIG. 11 is a flowchart showing the procedure of operation of an NIC 803 when multiple traffic flows are transmitted in parallel through forward routes.
Figure 12:
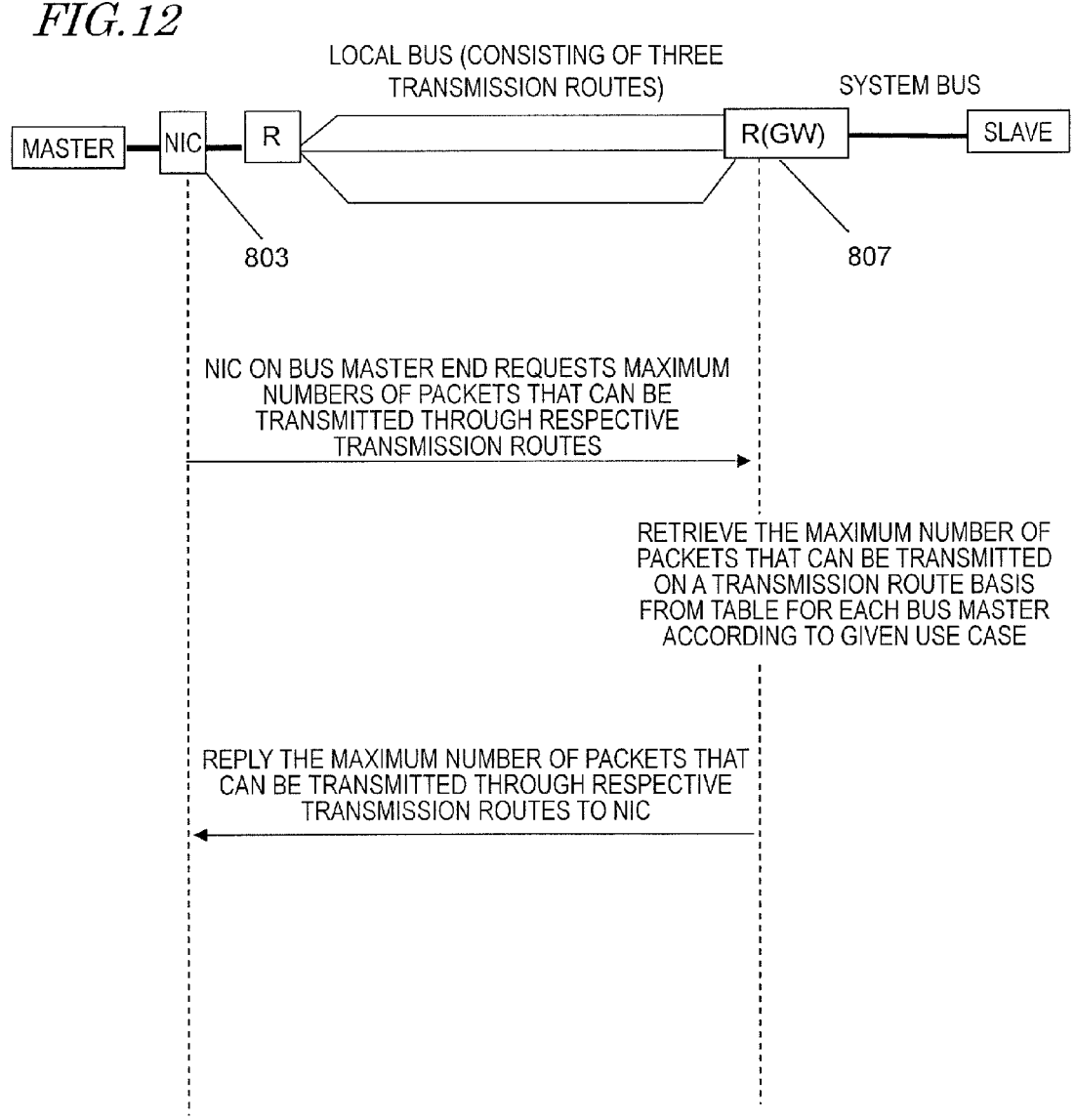
FIG. 12 shows the sequence of operations of the NIC 803 and a router GW 807 when multiple traffic flows are transmitted in parallel through the second bus.

FIG. 11 is a flowchart showing the procedure of operation of the NIC 803, and FIG. 12 shows the sequence of operations of the NIC 803 and the router GW 807, when multiple traffic flows are transmitted in parallel through forward routes.

Now let's pay attention to the timing when the use cases (e.g., the types of applications to run) are changed. At that timing, multiple different bus masters may newly start transmitting data. The transmission flow rate controller 802 of the NIC 803 which is connected to a bus master that is going to start operating newly requests the received amount allocator 806 of the router GW 807 to send the maximum numbers of packets that can be transmitted through the respective transmission routes (in Step S901). By performing this processing step, the maximum numbers of packets that can be transmitted through the respective transmission routes are defined. In this embodiment, these values are supposed to have been determined in advance during the design process on a use case basis.

In the router GW 807, when the router processor 804 receives the request for the maximum number of packets that can be transmitted, the received amount allocator 806 retrieves the maximum number of packets that can be transmitted on a transmission route basis from a table that the allocator 806 manages by itself for each bus master according to the given use case (in Step S902). The information managed there may be what is shown in FIGS. 13 and 14, for example, as will be described later in detail with reference to FIGS. 13 and 14.

The received amount allocator 806 transmits information about the amount of data that can be transmitted through each transmission route for each bus master, more specifically, information specifying the maximum number of packets that can be transmitted, to the transmission flow rate controller 802 of the NIC 803 via the router processor 804 (in Step S903). By reference to this information, the NIC 803 can specify the maximum number of packets that can be transmitted on a transmission route basis. And the transmission flow rate controller 802 of the NIC 803 controls the amount of data that can be transmitted through the transmission route in accordance with the information about the route-by-route maximum number of packets that can be transmitted that has been provided by the router GW 807.

After having performed this series of operations, the NIC 803 permits the bus master to transmit the data. As a result, the bus master starts transmitting the data. By performing this procedure, each bus master can transmit a traffic flow including an appropriate number of packets according to the given use case, and can minimize congestion on the local buses, the system bus, the router GW 807 and so on. Optionally, a plurality of routers GW may be connected as well.

Figures 13, 14:
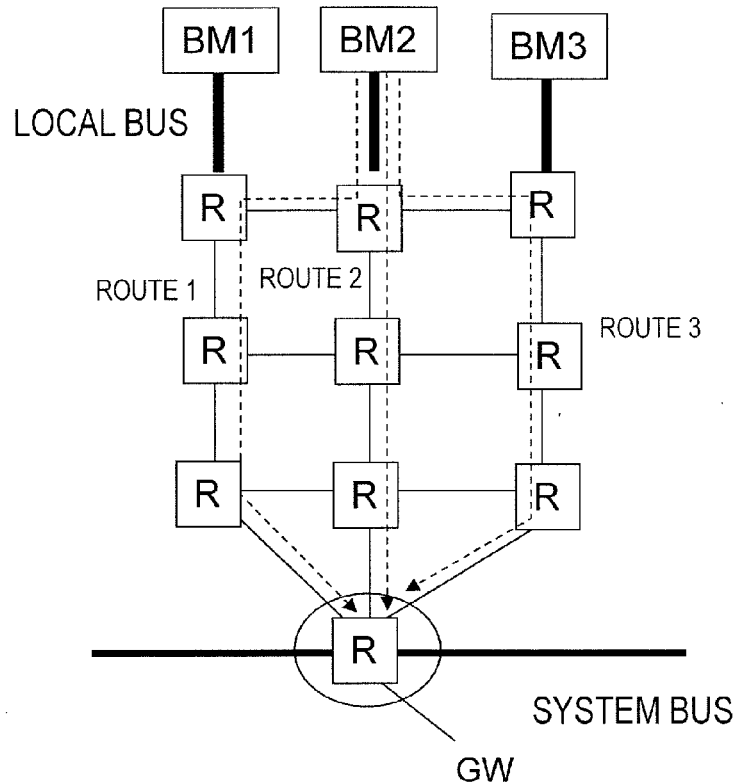
FIG. 13 schematically illustrates Transmission Routes #1 to #3 of a local bus.
FIG. 14 shows an amount of transmissible data allocation rule imposed on these Transmission Routes #1 to #3 shown in FIG. 13.

FIG. 13 schematically illustrates Transmission Routes #1 to #3 of a local bus, and FIG. 14 shows an amount of transmissible data allocation rule imposed on these Transmission Routes #1 to #3.

Hereinafter, it will be described how the maximum number of packets that can be transmitted may be managed by the received amount allocator 806 of the router GW 807. In the example illustrated in FIGS. 13 and 14, each bus master's shortest route is set to be the main route to be used by the bus master preferentially. For example, the main route of the bus master BM1 is route #1. In this router GW 807, the maximum number of packets that can be transmitted is allocated to each bus master's transmission route on a use case basis.

For example, as for BM1, the maximum number of packets that can be transmitted onto Route #1 is specified to be five. As for BM2, the maximum number of packets that can be transmitted onto Routes #1, #2 and #3 are specified to be three, five and four, respectively. Meanwhile, as for BM3, the maximum number of packets that can be transmitted is not specified for any of these three routes. Even though a method for managing the maximum number of packets that can be transmitted at the gateway intensively has been described, the management may also be made dispersively by the NICs of the respective bus masters.

Figure 15:
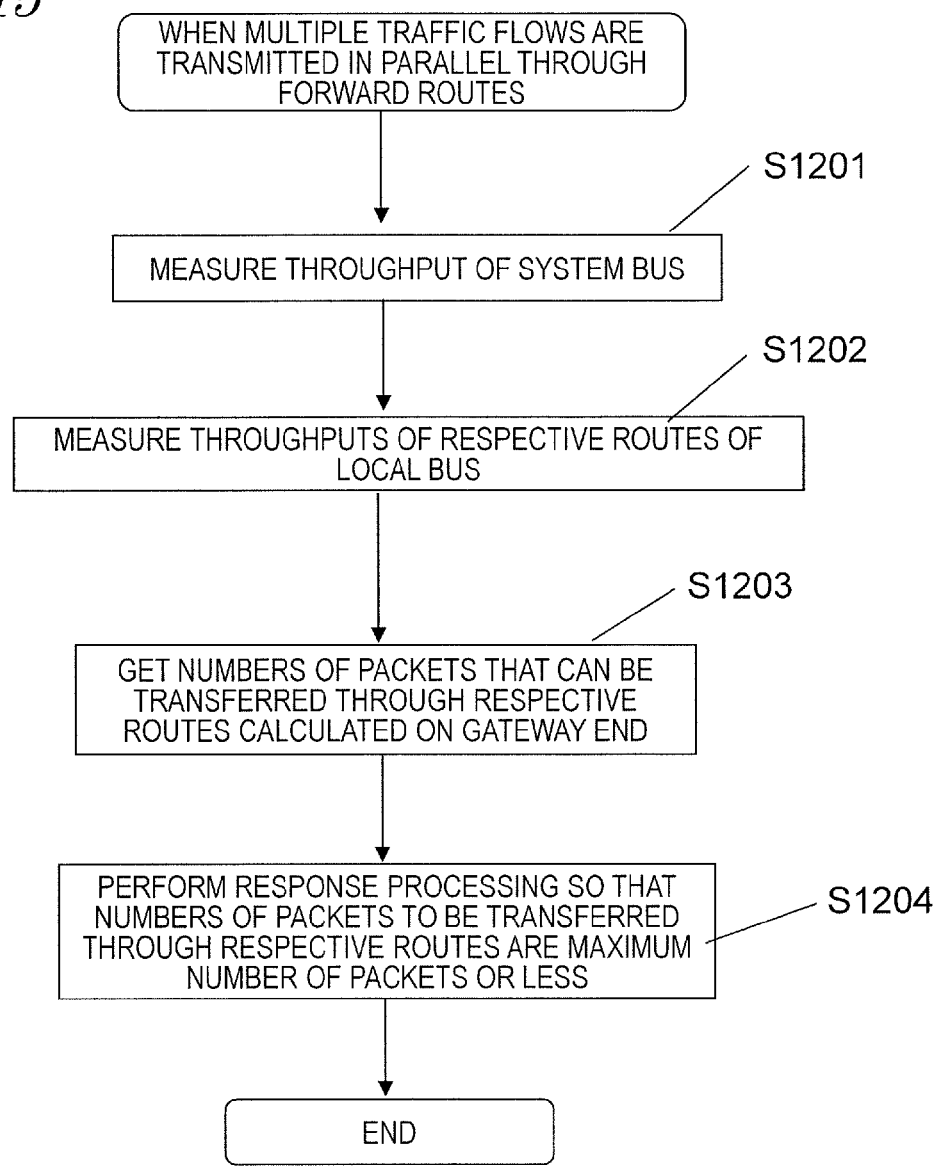
FIG. 15 is a flowchart showing the procedure of processing to be carried out by the router GW when multiple traffic flows are transmitted in parallel through forward routes.
Figure 16:
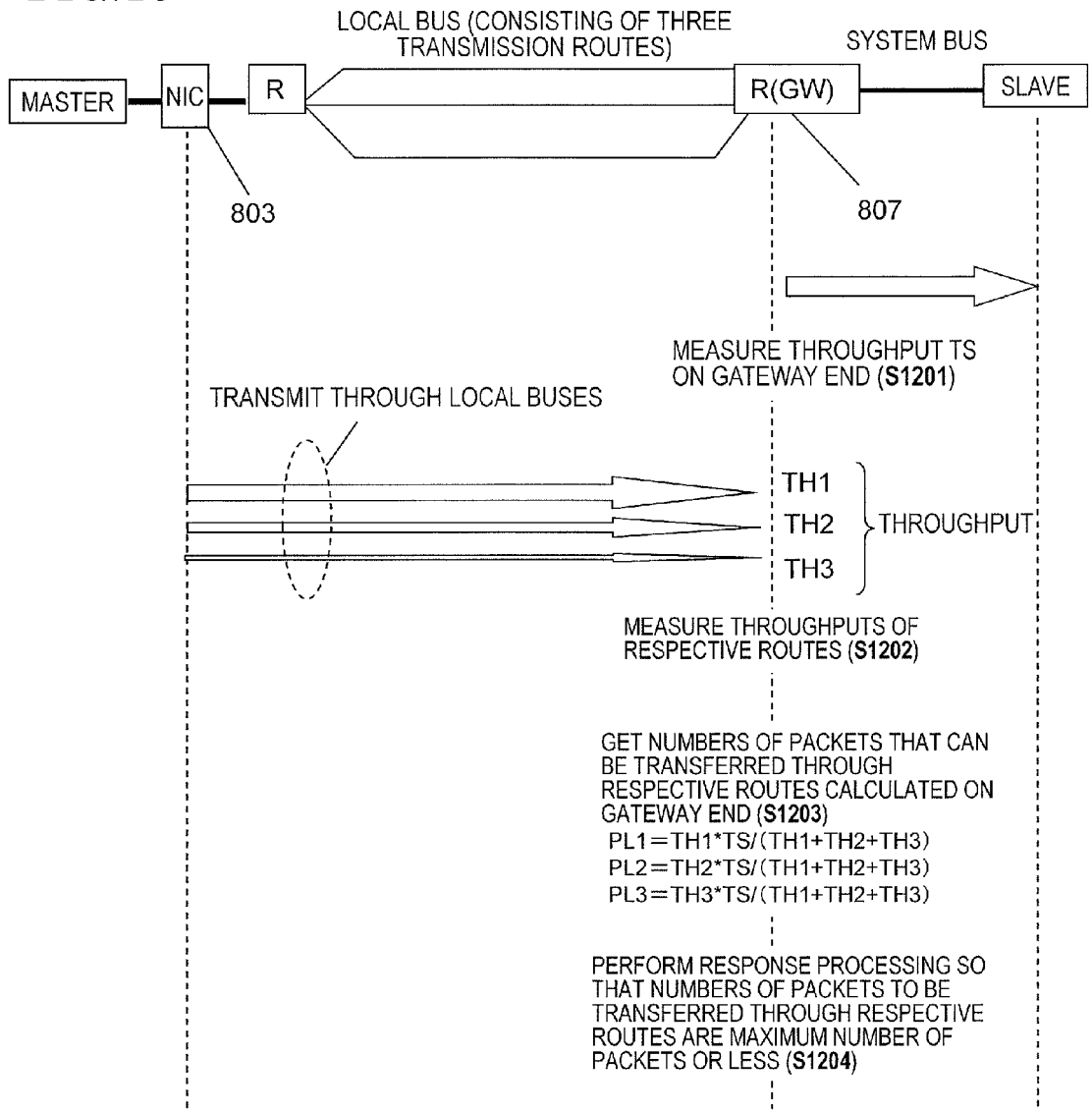
FIG. 16 shows the sequence of operations to be performed by NICs and the router GW when multiple traffic flows are transmitted in parallel through forward routes.

FIG. 15 is a flowchart showing the procedure of processing to be carried out by the router GW when multiple traffic flows are transmitted in parallel through forward routes. More specifically, the flowchart shown in FIG. 15 is carried out by the received amount allocator 806 of the router GW. On the other hand, FIG. 16 shows the sequence of operations to be performed by NICs and the router GW when multiple traffic flows are transmitted in parallel through forward routes.

Hereinafter, it will be described how to control the amount of transmissible data for each of multiple transmission routes of a local bus in a situation where packets are going to be transmitted from a single bus master to a particular slave (such as a memory) through a plurality of transmission routes of the local bus (on the forward route).

The received amount allocator 806 of the router GW 807 measures the throughput (i.e., the number of packets transmitted per unit time) of the system bus, through which the packets are transmitted from the router GW 807 to the slave (in Step S1201). It should be noted that the throughput may be measured either at the router GW 807 or at the slave on the receiving end. Optionally, to simplify the implementation, the maximum number of packets that can be transmitted as defined for the system bus during the design process may be given as throughput with a fixed value without measuring the throughput value. In the sequence of operations shown in FIG. 16, the number of packets being transferred to the system bus per unit time is indicated by TS.

Next, the received amount allocator 806 measures the throughputs of the respective transmission routes of the local bus (in Step S1202). The throughputs of the local bus may also be measured either at the NIC on the bus master end or at the gateway on the receiving end. In FIG. 16, the received amount allocator 806 of the router GW 807 measures the throughputs TH1 to TH3 of the respective transmission routes of the local bus.

Based on the throughput of the system bus and the throughputs of the respective transmission routes of the local bus, the received amount allocator 806 calculates the numbers of packets that can be transferred through the respective transmission routes of the local bus. Specifically, the received amount allocator 806 obtains the maximum numbers of packets that can be transmitted through the respective transmission routes of the local bus by multiplying the throughput of the system bus by the throughput ratio of the respective transmission routes of the local bus (in Step S1203). For instance, in the example shown in FIG. 16, the maximum number of packets PL1 that can be transmitted through a single transmission route of the local bus is calculated. As in the processing step S1203 shown in FIG. 16, the maximum number of packets PL1 can be calculated by PL1=TH1*TS/(TH1+TH2+TH3).

Next, in response to the packets that have been transmitted from the bus master to the router GW 807, the received amount allocator 806 performs in Step S1204 response processing of transmitting response packets to the bus master so that the numbers of packets to be transmitted through the respective transmission routes are limited to at most the maximum number of packets that can be subjected to the transfer processing on the respective transmission routes of the local bus. By performing this response processing, it is possible to prevent the bus master from sending out an excessive number of packets.

By performing this procedure, the maximum numbers of packets that can be transmitted through the respective transmission routes of the local bus are determined dynamically instead of being fixed during the design process, thereby coping with a traffic flow variation on the local buses and on the system bus more flexibly. As a result, it is possible to reduce the congestion at the gateway and to increase the transmission efficiency of the local buses and the system bus in terms of throughput and latency. Optionally, the throughputs of the system bus and the local buses may be measured on a regular basis independently of each other.

Figure 17:
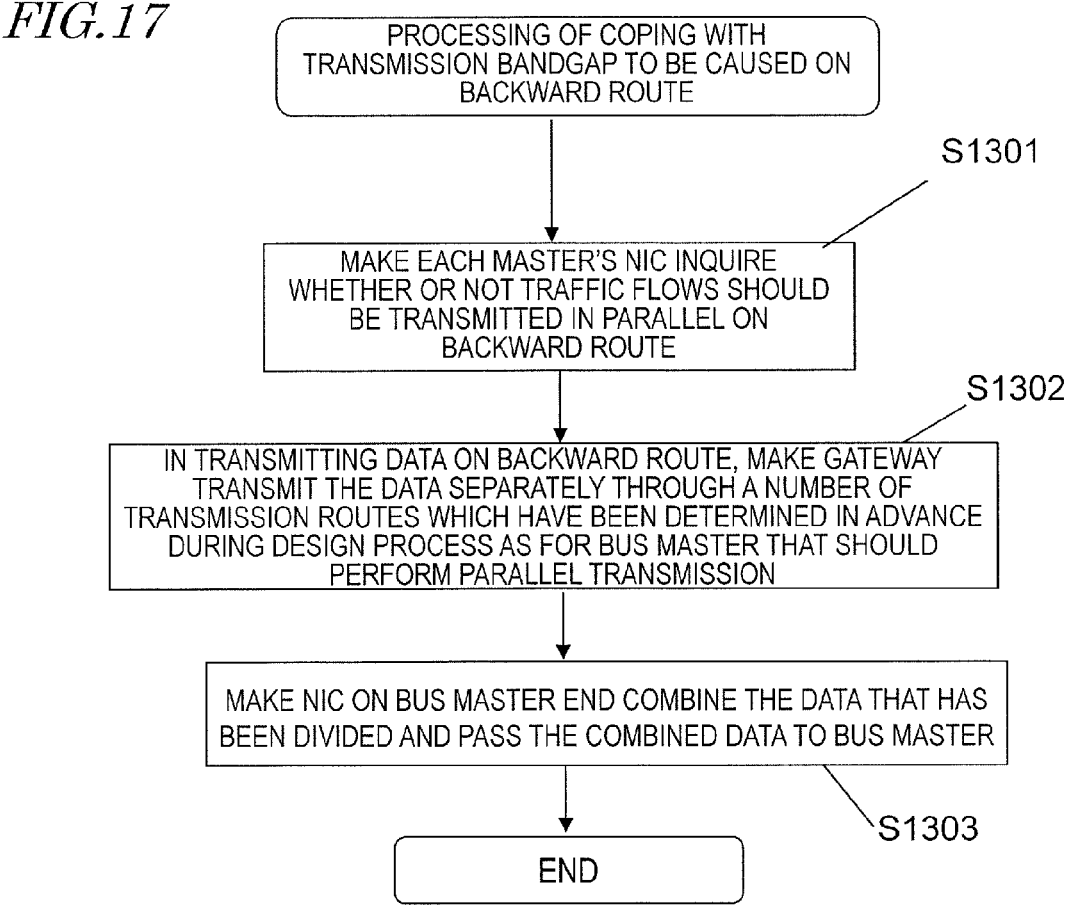
FIG. 17 shows the procedure of processing of closing a gap in transmission bandwidth on the backward route.
Figure 18:
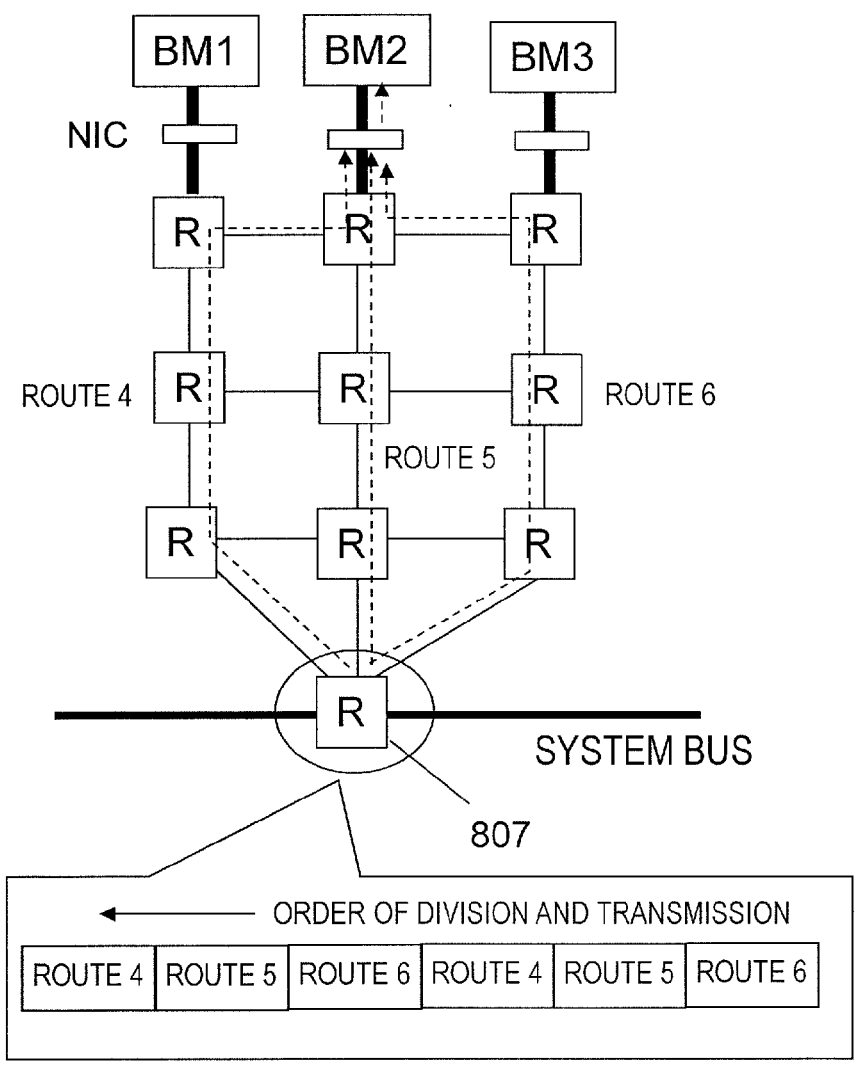
FIG. 18 shows how data may be transmitted through three Transmission Routes #4 to #6.

FIGS. 17 and 18 shows the processing of coping with a transmission bandgap to be caused between the system bus and the local buses on the backward route.

Suppose the given condition says that the system bus have a relatively high transfer rate and the local buses have a relatively low transfer rate. According to this condition, a gap in transmission bandwidth should be created between the system bus and the local buses. Specifically, under this condition, the transmission bandwidth becomes narrower on the backward route through which data is transmitted from the system bus to the local buses, and therefore, congestion should be caused at the entrance of the local buses. This congestion is caused because data is transmitted through only a particular transmission route.

That is why by transmitting data through a plurality of transmission routes in the local bus, the transfer rate of the local bus can be raised to the level of the transfer rate of the system bus even without increasing the operating frequency of the local bus. In the example to be described below, a number of transmission routes are supposed to be used on the backward route in order to close the gap in transmission bandwidth.

FIG. 17 shows the procedure of processing of closing the gap in transmission bandwidth on the backward route, and FIG. 18 shows how data may be transmitted through three Transmission Routes #4 to #6. Since an originally single transmission route is divided into three transmission routes, this processing will be sometimes referred to herein as "division processing".

When the use cases are changed, the transmission flow rate controller 802 of the NIC 803 connected to each bus master inquires of the received amount allocator 806 of the gateway GW 807 whether or not traffic flows should be transmitted in parallel on the backward route (in Step S1301). This inquiry relates to not only whether or not traffic flows should be transmitted in parallel but also what transmission routes should be used if the answer is YES.

As for whether or not traffic flows should be transmitted in parallel on the backward route, the decision is made by the transmission quality required by the bus master during the design process. Also, if the traffic flows should be transmitted in parallel on the backward route, the transmission routes for use to perform the parallel transmission need to be determined in advance so as to avoid causing traffic flow interference between bus masters. Although a method for managing the parallel transmission intensively at the gateway GW 807 has been described, the parallel transmission may also be managed dispersively by the NICs of the respective bus masters.

In the example illustrated in FIG. 18, only the bus master BM2 is supposed to perform the parallel transmission and the other bus masters are supposed to transmit no data on the backward route. Then, the bus master BM2 can perform the parallel transmission using all of the three transmission routes.

In transmitting data on the backward route, the transmission flow rate controller 805 of the gateway GW 807 transmits the data separately through a number of transmission routes which have been determined in advance during the design process as for the bus master that should perform the parallel transmission (in Step S1302). In the example shown in FIG. 18, since the parallel transmission is performed through the three Transmission Routes #4, #5 and #6, the data is divided into three. Alternatively, to simplify the implementation, the gateway GW 807 may get the packets that have been received from the system bus classified into multiple groups and evenly assigned to those transmission routes by the Round Robin method.

It should be noted that the route numbers shown in FIG. 18 are different from the ones shown in FIGS. 13 and 14. This means that transmission routes can be determined on the forward and backward routes independently of each other. This also means that either a traffic flow that has been transmitted through the Transmission Route #1 on the forward route or another traffic flow that has been generated from the former traffic flow is not always transmitted through the same Transmission Route #1 on the backward route.

The transmission flow rate controller 802 of the NIC 803 for the bus master BM2 combines the data that has been divided and passes the combined data to the bus master BM2 (in Step S1303). In the example illustrated in FIG. 18, three traffic flows, which are as many as the transmission routes on the backward route, are combined together at the NIC, and then the combined traffic flow is transmitted to the bus master BM2. The transmission flow rate controller 802 of the NIC 803 controls the order of the packets so that the order of the packets that have not been classified and assigned to the respective transmission routes yet agrees with that of the packets that have been combined at the NIC 803. For example, the transmission flow rate controller 802 may make the management by sequentially numbering those packets in the order of division.

By performing this procedure, the gap in transmission bandwidth between the local and system buses on the backward route can be closed by speeding up the transmission in a local bus with the traffic flow interference between multiple bus masters in the same local bus minimized.

Figure 19:
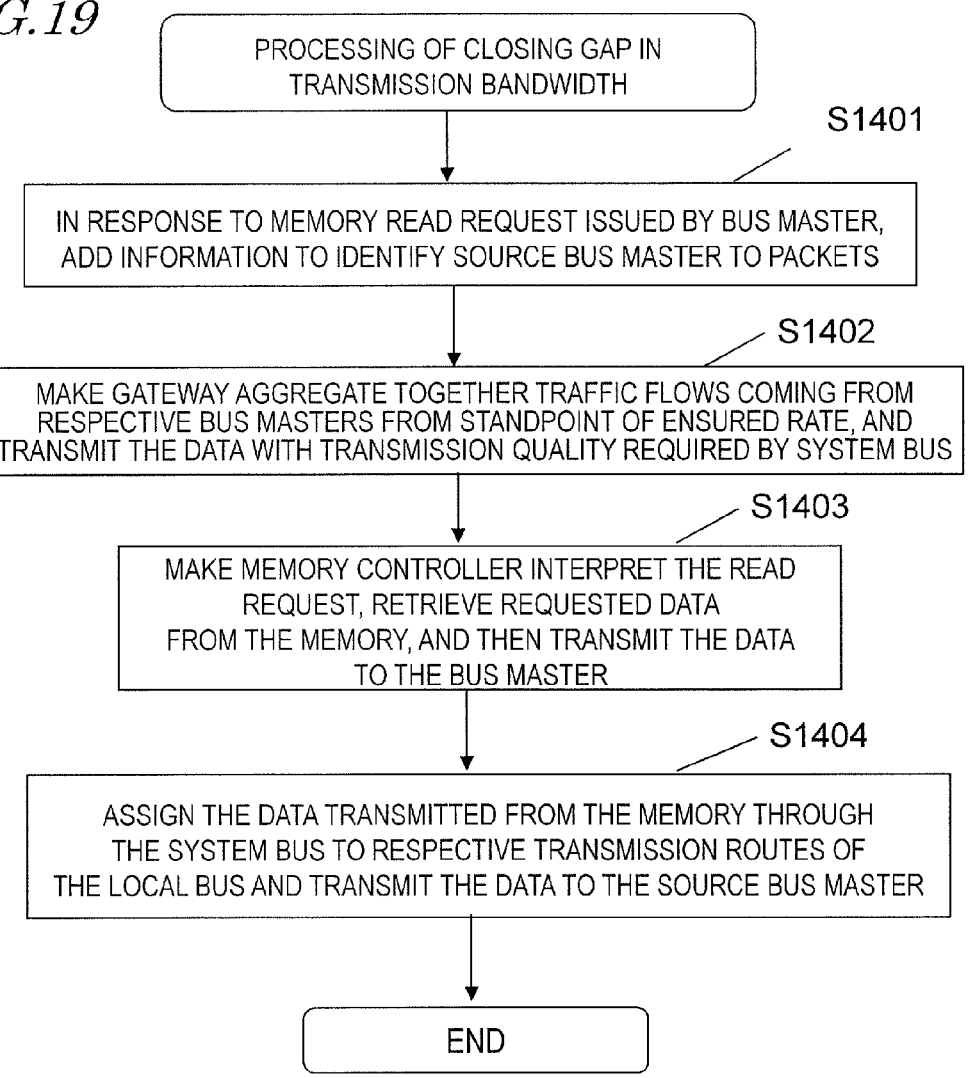
FIG. 19 is a flowchart showing the procedure of processing of closing the gap in transmission bandwidth between the system and local buses.
Figure 20:
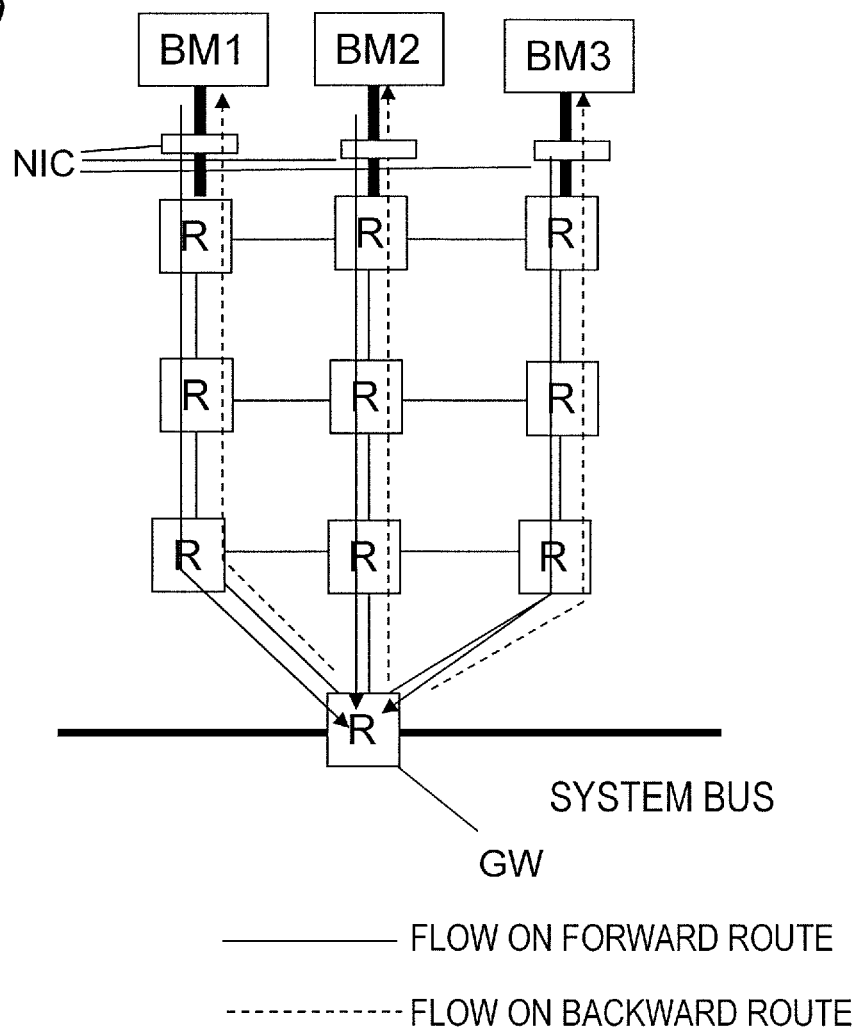
FIG. 20 shows association between the processor and the transmission routes.

FIG. 19 is a flowchart showing the procedure of processing of closing the gap in transmission bandwidth between the system and local buses. In FIG. 19, shown is the procedure of processing of transmitting a processor's data. FIG. 20 shows association between the processor and the transmission routes.

To get the respective transmission routes of a local bus associated easily with the processor, in response to a memory read request that has been issued by a bus master, the transmission flow rate controller 802 of the NIC 803 adds information to identify the source bus master to the packets (in Step S1401). In the example illustrated in FIG. 20, a main route has been allocated in advance to each bus master BM. As a result, their transmission routes are independent of each other and traffic flow interference between them can be avoided.

The router processing section 804 of the gateway GW 807 aggregates together the traffic flows that have come from the respective bus masters from the standpoint of the ensured rate, and the transmission flow rate controller 805 transmits the data from the gateway GW 807 with the transmission quality required by the system bus (in Step S1402). In the gateway GW 807, the transmission flow rate controller 805 performs the bandwidth control so that the amount of data transmitted from each bus master at least corresponds to the ensured rate (i.e., the throughput required by the processor). This bandwidth control may get done by adjusting the transfer rate to a fixed rate, for example. By getting the bandwidth control done on the local bus in advance, a traffic flow can be handled on the system bus as if the traffic flow had been transmitted from a single transmission node with a high ensured rate. As a result, the implementation of the system bus to ensure the router's performance can be simplified.

Figure 21:
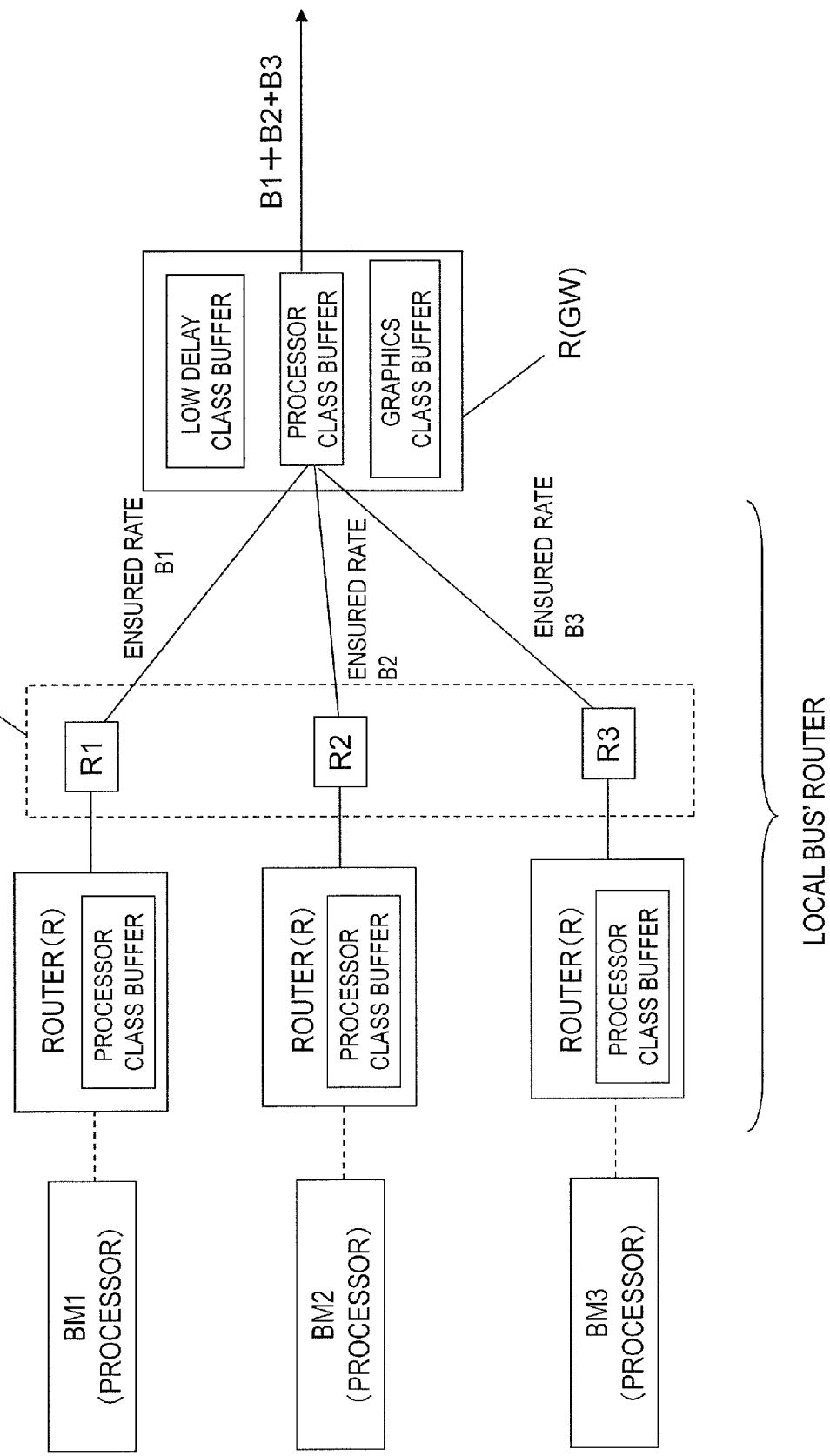
FIG. 21 shows relations between the traffic flows transmitted from three processors as bus masters and ensured rates.

For example, FIG. 21 shows relations between the traffic flows transmitted from three processors as bus masters and ensured rates.

As shown in FIG. 21, if traffic flows are transmitted from processors that are bus masters, some of those traffic flows may be transmitted at a rate exceeding the ensured rate that is guaranteed for its associated bus master. In that case, to guarantee the ensured rate for every bus master, the routers R1, R2 and R3 which are arranged right before the router GW to pass data from the local buses to the system bus limit the bands to be allocated to the respective traffic flows that have been output from the respective bus masters. Specifically, in the example illustrated in FIG. 21, transmission bands B1, B2 and B3 are allocated to the bus masters BM1, BM2 and BM3, respectively. This bandwidth control is carried out in addition to the bandwidth control to be performed by the router GW based on the maximum number of packets that can be transmitted. Optionally, the bandwidth control may be carried out by the router GW at a time as described above.

Then, the traffic flows that have been transmitted from the respective processors are aggregated together into a single traffic flow of a processor class, which is then transmitted to the receiving node. As shown in FIG. 21, the transmission bandwidth of that traffic flow is B1+B2+B3.

It should be noted that a "class" corresponding to the priority level of transmission may be set for each traffic flow. Examples of such classes include a "low delay class" which imposes the strictest delay condition, a "processor class" which imposes the second strictest delay condition, and a "graphics class" which imposes a looser delay condition than any of the two classes. For example, the router GW shown in FIG. 21 is provided with multiple buffers to store data of the respective classes. These buffers may be provided for the transmission flow rate controller 805, for example.

Even though no NICs are illustrated in FIG. 21 for the respective bus masters, their illustration is just omitted in FIG. 21. Also, due to the bandwidth control, the output of packets from each of those NICs is limited. Furthermore, in FIG. 21, the local buses leading from the respective bus masters to the router GW are not clearly illustrated as distributed buses. However, this illustration is also adopted just for convenience sake. That is to say, the transmission routes leading from the respective bus masters to a band-limiting router Rn (where n is an integer) may be distributed buses, too.

In the example illustrated in FIG. 21, multiple different buffers may be provided for the respective routers according to their respective required qualities. Specifically, three classes (namely, "low delay", "processor" and "graphics") are provided according to the required qualities. The routers transmit data preferentially in the order of the "low delay", "processor" and "graphics".

It should be noted that if any traffic flow needs to be transmitted at a rate exceeding the ensured rate, such a traffic flow may be transmitted in an interval in which no other bus masters are transmitting any traffic flow at the ensured rate or less. As a result, the router on the system bus end does not have to include the same number of buffers as the processors (or bus masters), and therefore, the implementation of the router can be simplified.

Figure 22:
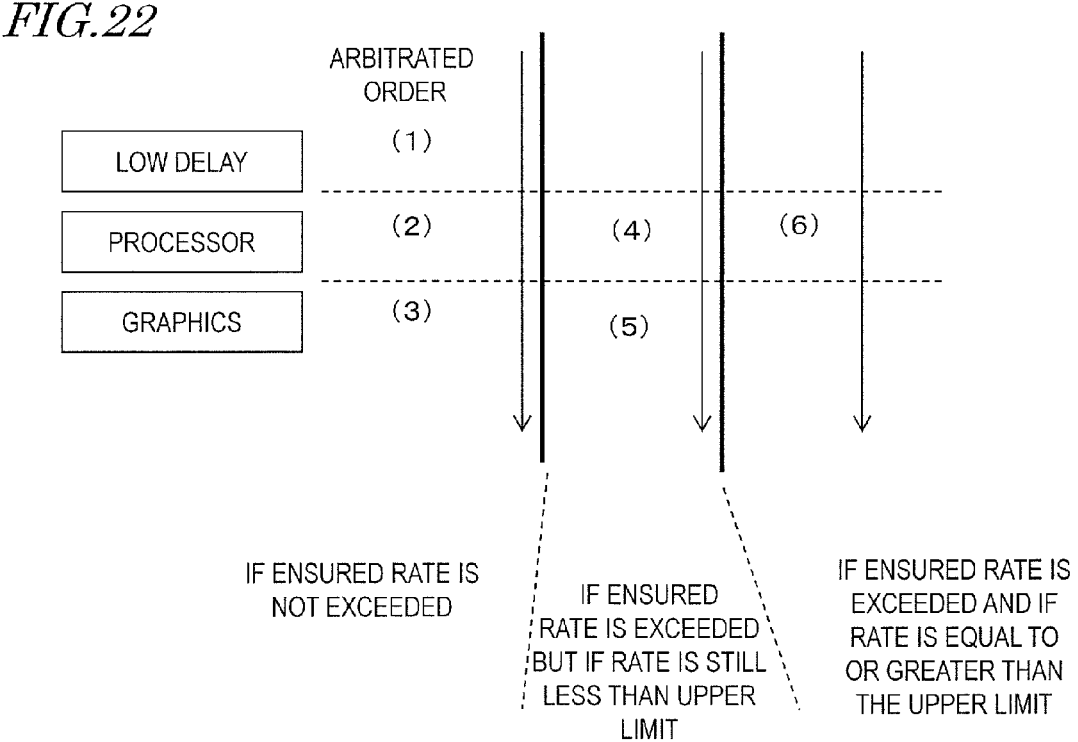
FIG. 22 shows the order of transmission that has been fixed through class-by-class arbitration.

FIG. 22 shows the order of transmission that has been fixed through the class-by-class arbitration (which will be referred to herein as an "arbitrated order"). As long as the ensured rate is not exceeded, data is transmitted in the order of the "low-delay", "processor" and "graphics" classes (i.e., in the arbitrated order of (1), (2) and (3)) following the rule described above. On the other hand, if the ensured rate is exceeded but if the rate is still less than a predetermined upper limit (threshold value), data is transmitted in the order of the "processor" and "graphics" classes (i.e., in the arbitrated order of (4) and (5)). And if the rate is equal to or greater than the predetermined upper limit (threshold value) and if there is any unused band available, data is transmitted for the "processor" class (in the arbitrated order of (6)). It can be said that according to this arbitrated order, the processor class data has its arbitrated order changed according to the transmission rate but there is no upper-limit ensured rate for the processor class. Although no upper limit ensured rate is supposed to be imposed on the processor class in this example, this method of arbitration is also applicable to the graphics class in the same way.

Now take a look at FIG. 19 again.

The memory controller interprets the read request, retrieves requested data from the memory, and then transmits the data to the bus master through the forward route system bus and the forward route local bus (in Step S1403).

Next, the transmission flow rate controller 805 of the router GW 807 assigns the data that has been transmitted from the memory through the system bus to the respective transmission routes of the local bus and transmits the data to the bus master (processor) that has issued the request to read that data (in Step S1404).

When transmitted backward from the memory to the bus master, the traffic flow needs to be transmitted from the memory without being blocked or relayed by any router on the way. For that reason, according to this embodiment, the backward transmission route is set so as to trace back the forward transmission route. This can be done by making the transmission flow rate controller 805 of the gateway 807 hold information (such packet IDs) to identify a request issued by each bus master so that the packet IDs are associated with local bus routes. If the same packet IDs are added to the data that has been retrieved and transmitted from the memory in response to the read request, the transmission flow rate controller 805 of the gateway 807 can transmit the data backward to the bus master that has issued the request to read that data through the same route as when the data was transmitted forward to the bus master. The backward route transmission is carried out independently on a processor basis. As a result, the traffic flow interference can be eliminated on the backward route (see FIG. 20).

In the foregoing description, an embodiment of the traffic flow transmission method has been described as being applied to transmitting a processor class traffic flow to a bus master. However, this method is also applicable in the same way to transmitting a graphics class traffic flow or any other traffic flow with a similar property. Likewise, the foregoing description that has been made with reference to other drawings does not have to be applied to a processor class traffic flow, either. Furthermore, the transmission route does not have to be a straight one such as the ones shown on the drawings. Optionally, any arbitrary transmission route may be selected in advance by either a static routing method or a dynamic routing method. In the same way, the foregoing description that has been made with reference to other drawings is also applicable to any arbitrary transmission route. Although a traffic flow transmission method has been described as being applied to read processing, this method can also be applied in the same way to write processing.

Figure 23:
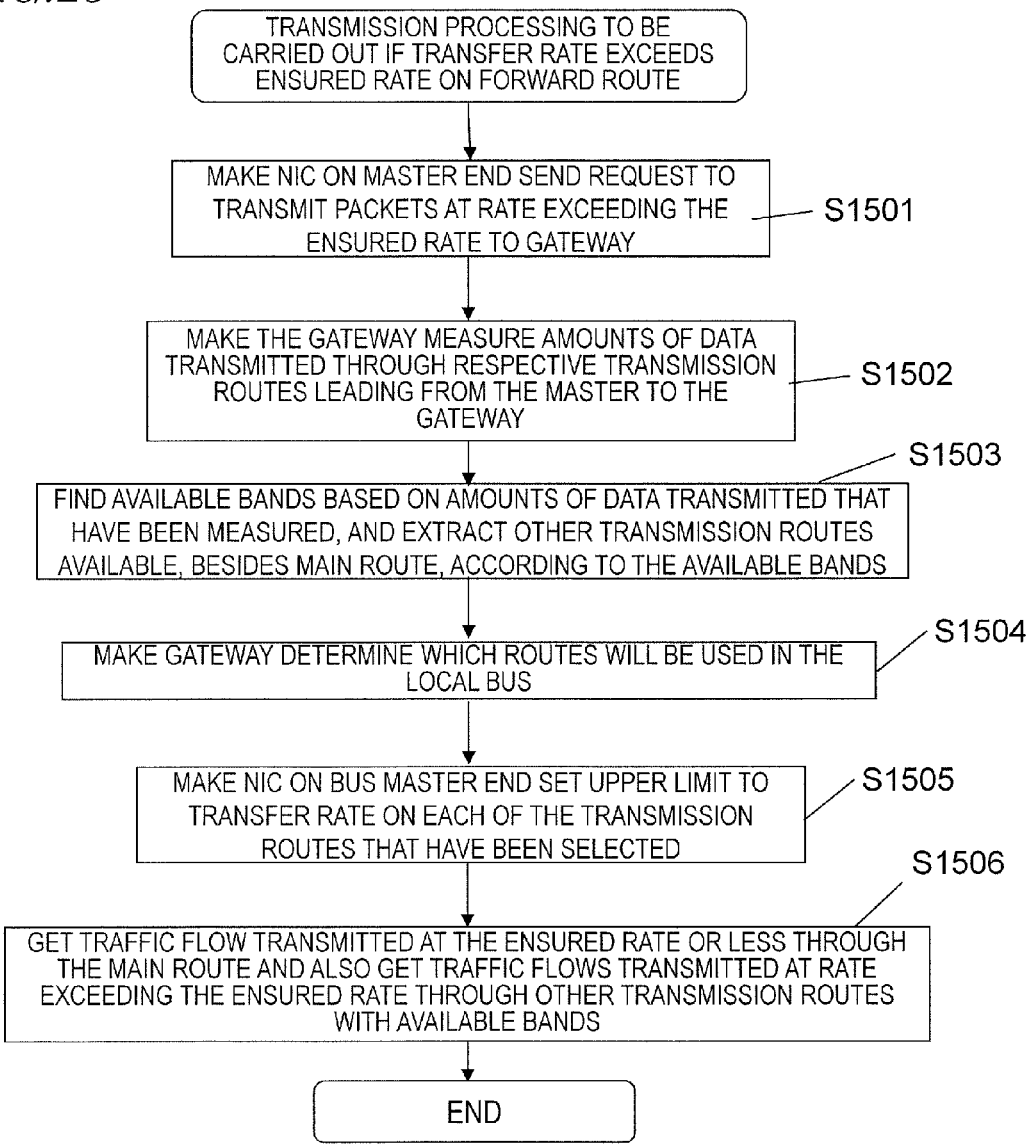
FIG. 23 is a flowchart showing the procedure of transmission processing to be carried out if the transfer rate exceeds the ensured rate on the forward route.

FIG. 23 shows the procedure of transmission processing to be carried out if the transfer rate exceeds the ensured rate on the forward route.

In this case, if the transfer rate exceeds the ensured rate, packets to be transmitted at the ensured rate or less are transmitted through only the main route, while packets to be transmitted at a rate exceeding the ensured rate are transmitted through not only the main route but also a bypass route as well. The ensure rate represents the minimum required transmission bandwidth of a bus master. If packets are transmitted at a rate exceeding the ensured rate, the processing at the bus master can get done smoothly and the packet transmission efficiency can be further increased in terms of throughput and delay.

The NIC 803 on the bus master end sends a request to transmit packets at a rate exceeding the ensured rate to the gateway 807 (in Step S1501).

The received amount allocator 806 of the gateway 807 measures the amounts of data transmitted through the respective transmission routes leading from the bus master to the gateway 807 (in Step S1502).

The received amount allocator 806 finds available bands based on the amounts of data transmitted that have been measured, and extracts other transmission routes available, besides the main route, according to the available bands (in Step S1503). For example, if the available bands account for 50%, decision is made by the received amount allocator 806 that there should be other routes available, not just the main route. It should be noted, however, that packets can be transmitted through the main route even if available bands is short of 50%.

The received amount allocator 806 of the gateway 807 determines which transmission routes (including the main route and transmission routes with available bands) will be used in the local bus and notifies the target NIC of them via the router processor 804 (in Step S1504).

In response, the transmission flow rate controller 802 of the NIC 803 on the bus master end sets an upper limit to the transfer rate on each of the transmission routes that have been selected (in Step S1505).

And the transmission flow rate controller 802 gets a traffic flow transmitted at the ensured rate or less through the main route and also gets traffic flows transmitted at a rate exceeding the ensured rate through other transmission routes with available bands (in Step S1506).

Figure 24:
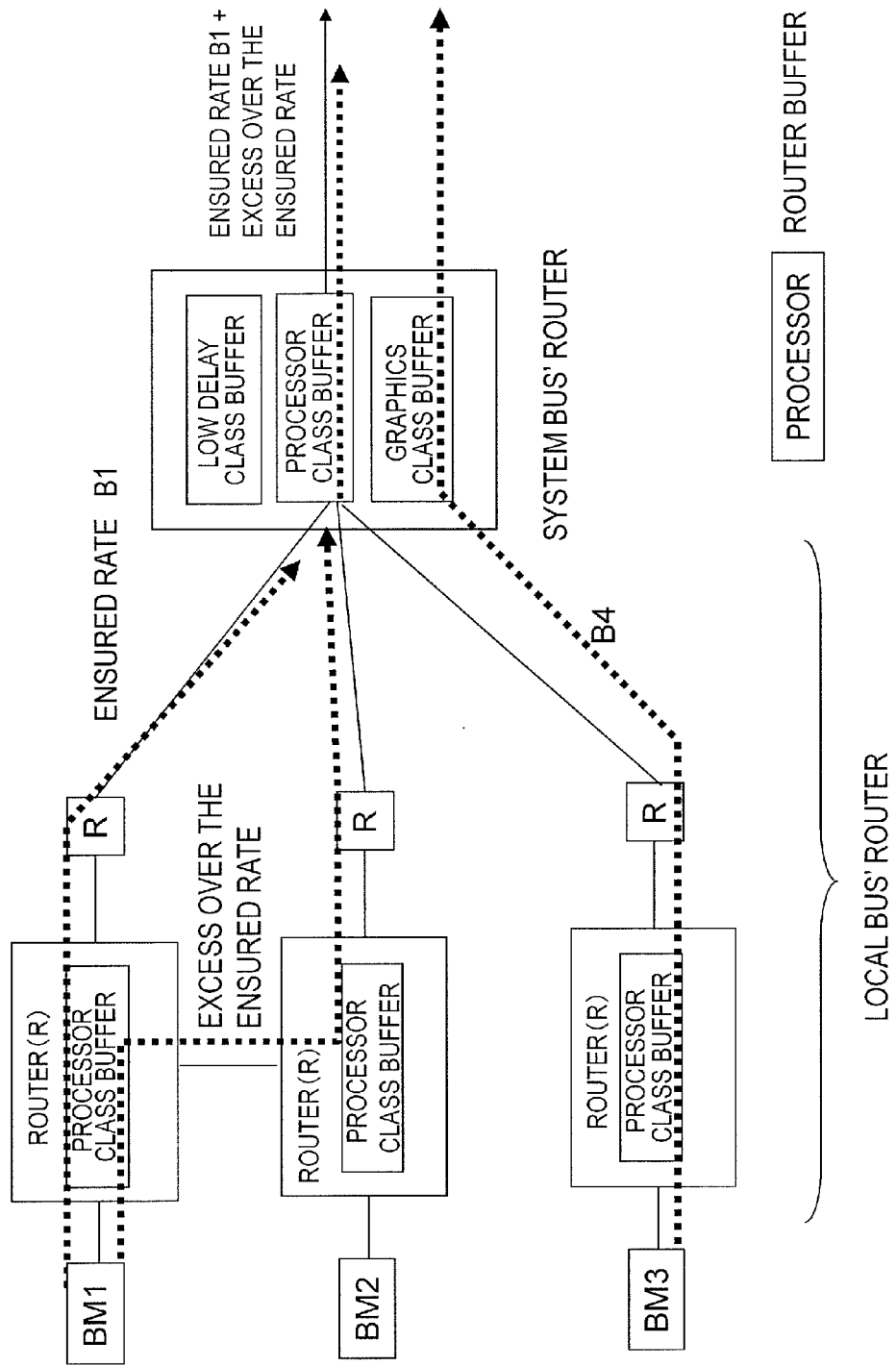
FIG. 24 illustrates how data is transmitted through a main route and transmission routes with available bands.

FIG. 24 illustrates how data is transmitted through a main route and transmission routes with available bands. In this case, what should be transmitted is a processor class request to be transmitted from a bus master BM1. Part of the data is transmitted through the main route at an ensured rate B1 and the rest of the data is the remaining data that has not been transmitted successfully at the ensured rate B1 and is transmitted through other routes with available bands.

Portion (i) of FIG. 25 shows how bands are allocated to the main route and portion (ii) of FIG. 25 shows how bands are allocated to transmission routes with available bands, other than the main route. As shown in portion (i) of FIG. 25, a transmission band has been secured in advance during the design process for a traffic flow to be transmitted at the ensured rate or less through the main route. On the other hand, as shown in portion (ii) of FIG. 25, as for the transmission routes other than the main route, the available bands are calculated by subtracting the transmission band that has been, or may be, allocated to the man route (i.e., the band that has been secured during the design process) and the transmission band that has been allocated to transmission routes other than the main route from the maximum transmission bandwidth of the transmission routes. As for a traffic flow to be transmitted at a rate exceeding the ensured rate, each bus master may perform the procedure of holding and releasing each transmission route between the gateway and the bus master. As a result, there is no need to perform the processing of measuring the available bands and the hardware implementation can be simplified.

A traffic flow to be transmitted at the ensured rate or less through the main route is supposed to be subjected to transfer processing at a high priority level by a router which relays the data from a bus master to the gateway. On the other hand, a traffic flow to be transmitted at a rate exceeding the ensured rate through other routes is supposed to be subjected to the transfer processing by the router at a lower priority level than a traffic flow to be transmitted through the same routes at the ensured rate less. Thus, a traffic flow to be transmitted at a rate exceeding the ensured rate may be given a lower priority in processing than a traffic flow to be transmitted at the ensured rate or less. For example, in an application to be run by a processor, a media processing application which is given a high priority is associated with a traffic flow to be transmitted at the ensured rate or less, while a Web or email application which is given a low priority is associated with a traffic flow to be transmitted at a rate exceeding the ensured rate. As can be seen, when a processor carries out its processing, the required performance varies significantly from one application to another.

By adopting the configuration described above, a traffic flow can be transmitted as quickly as through a system bus with the operating frequency of the local buses kept low and with congestion on the bus escaped.

The present disclosure is applicable to not only bus lines within a chip but also bus lines between chips. FIG. 26 illustrates an example in which the present disclosure is applied to a situation where multiple SoCs are connected together. In general, lines to connect multiple SoCs together are laid out on a printed circuit board, and therefore, it is difficult to transmit data as quickly as in a situation where bus lines are laid out within a chip. For that reason, if multiple transmission routes are arranged in parallel in the line portion Z that connects multiple SoCs together, transmission through the buses can be speeded up without raising the operating frequency of the buses significantly.

The present disclosure is also applicable to the situation shown in FIG. 26 where there are three or more buses with mutually different rates (i.e., a bus within SoC1, a bus within SoC2 and a bus that connects SoC1 and SoC2 together).

Although no NICs are shown in FIG. 26, their illustration is just omitted for the sake of simplicity. Actually, each SoC includes a series of components that cover the range of the bus master through the router GW shown in FIG. 10. And the router GWs of the respective SoCs are connected together through the bus that is arranged between those SoCs.

A semiconductor circuit bus system according to the present disclosure can be used to transmit data on a system LSI.

While the present invention has been described with respect to preferred embodiments thereof, it will be apparent to those skilled in the art that the disclosed invention may be modified in numerous ways and may assume many embodiments other than those specifically described above. Accordingly, it is intended by the appended claims to cover all modifications of the invention that fall within the true spirit and scope of the invention.

What is claimed is:

1. A bus system for a semiconductor circuit, the system comprising:
    a first bus which has a first transfer rate;
    a second bus which has a second transfer rate that is higher than the first transfer rate;
    a first node which transmits data;
    a bus interface which connects the first node to the first bus;
    a router which connects the first and second buses together; and
    a second node which is connected to the second bus and which receives the data,
    wherein the first bus is comprised of distributed buses which have multiple transmission routes leading from the bus interface to the router,
    the router includes:
    an allocator which allocates, in accordance with a predetermined reference, the amounts of transmissible data to the respective transmission routes of the first bus and which provides information about the amounts of transmissible data of the respective transmission routes for the bus interface;
    a router processor which receives the data flowing through the respective transmission routes of the first bus and transfers the data to the second bus; and
    a second controller which controls the flow rate of the data flowing through the second bus, and
    the bus interface includes:
    a transfer processor which transfers the data that has been received from the first node to the respective transmission routes of the first bus; and
    a first controller which controls the flow rate of the data flowing through the respective transmission routes of the first bus by reference to the information that has been provided by the router about the amounts of transmissible data of the respective transmission routes.

2. The bus system of claim 1, wherein the second controller controls the flow rate of the data flowing through the second bus based on the throughputs of the respective transmission routes of the first bus and the throughput of the second bus.

3. The bus system of claim 1, wherein the transfer processor of the bus interface packetizes the data that has been received from the first node into packets and then transfers the packets to the respective transmission routes of the first bus,
    information about the upper limit of the number of packets that can be transmitted through the respective transmission routes of the first bus has been defined in advance as the predetermined reference, and
    the allocator of the router allocates the amounts of transmissible data to the respective transmission routes in accordance with the information about the upper limit.

4. The bus system of claim 3, wherein the transfer processor of the bus interface packetizes the data that has been received from the first node into packets and then transfers the packets to the respective transmission routes of the first bus, and
    the allocator of the router allocates the amounts of transmissible data to the respective transmission routes by reference to not only the information about the upper limit of the number of packets but also information about the throughputs of the respective transmission routes of the first bus as the predetermined reference.

5. The bus system of claim 4, wherein the allocator of the router allocates the amounts of transmissible data to the respective transmission routes based on the ratio of the throughputs of the respective transmission routes to the throughputs of all of the transmission routes of the first bus.

6. The bus system of claim 1, wherein the transfer processor of the bus interface packetizes the data that has been received from the first node into packets and then transfers the packets to the respective transmission routes of the first bus, and
    the allocator of the router allocates the amounts of transmissible data to the respective transmission routes in accordance with the throughputs of the respective transmission routes of the first bus as the predetermined reference.

7. The bus system of claim 6, wherein the allocator of the router allocates the amounts of transmissible data to the respective transmission routes based on the ratio of the throughputs of the respective transmission routes to the throughputs of all of the transmission routes of the first bus.

8. The bus system of claim 1, wherein the second node is able to transmit data to the first node, and
    the router processor transfers the data that has been received from the second node to the first node through the first bus.

9. The bus system of claim 8, wherein the router processor transfers the data that has been received from the second node to the first node through the multiple transmission routes of the first bus.

10. A bus system for a semiconductor circuit, the system comprising:
    a first bus which has a first transfer rate;
    a second bus which has a second transfer rate that is higher than the first transfer rate;
    a plurality of first nodes, each of which transmits data;
    a plurality of bus interfaces, each of which connects an associated one of the first nodes to the first bus;
    a router which connects the first and second buses together; and
    at least one second node which is connected to the second bus and which receives the data, wherein the first bus is comprised of distributed buses which have multiple transmission routes leading from the bus interfaces to the router, the router includes:

an allocator which allocates, in accordance with a predetermined reference, the amounts of transmissible data to the respective transmission routes of the first bus and which provides information about the amounts of transmissible data of the respective transmission routes for the bus interfaces;

a router processor which receives the data flowing through the respective transmission routes of the first bus and transfers the data to the second bus; and a second controller which controls the flow rate of the data flowing through the second bus and which aggregates together multiple sets of data that have been received from the plurality of first nodes so as to guarantee an ensured transfer rate for each said first node and then transmits the data to the second node, and each said bus interface includes:

a transfer processor which transfers the data that has been received from the first node connected to the respective transmission routes of the first bus; and a first controller which controls the flow rate of the data flowing through the respective transmission routes of the first bus by reference to information about a transmission bandwidth which is limited based on the transfer rate to be guaranteed and information about the amounts of transmissible data of the respective transmission routes that has been provided by the router.

11. The bus system of claim 10, wherein the transmission bandwidth that is limited based on the transfer rate to be guaranteed is limited by either the router or another router that is different from the former router.

12. A bus system for a semiconductor circuit, the system comprising:

a first bus which has a first transfer rate;

a second bus which has a second transfer rate that is lower than the first transfer rate;

a third bus which has a transfer rate that is higher than the second transfer rate of the second bus;

a first node which transmits data;

a bus interface which connects the first node to the first bus;

a first router which connects the first and second buses together;

a second router which connects the second and third buses together; and a second node which is connected to the third bus and which receives the data, wherein the first bus is comprised of distributed buses which have multiple transmission routes leading from the bus interface to the router, the first router includes:

an allocator which allocates, in accordance with a predetermined reference, the amounts of transmissible data to the respective transmission routes of the first bus and which provides information about the amounts of transmissible data of the respective transmission routes for the bus interface;

a router processor which receives the data flowing through the respective transmission routes of the first bus and transfers the data to the second bus; and a second controller which controls the flow rate of the data flowing through the second bus, and the second router includes:

a router processor which receives the data flowing through the respective transmission routes of the second bus and transfers the data to the third bus; and a second controller which controls the flow rate of the data flowing through the third bus, and the bus interface includes:

a transfer processor which transfers the data that has been received from the first node to the respective transmission routes of the first bus; and a first controller which controls the flow rate of the data flowing through the respective transmission routes of the first bus by reference to the information that has been provided by the first router about the amounts of transmissible data of the respective transmission routes.

* * * * *